INVENTOR
ROBERT M. MEADE
BY
MITCHELL & BECHERT
ATTORNEY

United States Patent Office 3,005,112

Patented Oct. 17, 1961

3,005,112

DIRECT COUPLED TRANSISTOR LOGIC USING COMMONED EMITTERS AND COMPLEMENTARY LOGIC BLOCKS

Robert M. Meade, Wassaic, N.Y., assignor to International Business Machines Corporation, New York, N.Y., a corporation of New York Filed Apr. 14, 1960, Ser. No. 27,235
23 Claims. (Cl. 307—88.5)

This invention relates to logical circuits of the type which deliver output signals in response to predetermined combinations of input signals. More particularly, the invention relates to such logical circuits comprising transistors.

Logical circuits have found extensive use in calculating equipment. Transistors, as a result of their size and characteristics, have been used extensively in such logical circuits. Use of the transistor permits a substantial reduction in the number of circuit components and also reduces the power requirements as compared to components previously used. One reason for the reduction in circuit components is that the transistor can function as a logical element and as an amplifier. Further, transistors may be coupled directly from stage to stage by simply using transistors of opposite conductivity in the alternate stages. Circuits of this type are sometimes referred to as complementary circuits.

In logic systems, logic "blocks" are often employed which utilize a plurality of junction transistors of like conductivity type. In the block, one transistor is usually conducting while the others are off. The normally conducting transistor may be predetermined by application of a suitable biasing potential to its base. One of the other transistors in the block may be made conducting, and the normally conducting transistor cut-off, by application of a signal more strongly biased in the conducting direction than the bias on the normally conducting transistor. By way of example, if the logic block were of the n type, that is consisting of pnp transistors, the bias potential on the base of the normally conducting transistor may be at ground. Negative signal inputs may be selectively applied respectively to the base electrodes of the other transistors in the block, whereby conduction control is taken away from the normally conducting transistor. A typical signal voltage is between −0.4 to −0.8 volt. The analogous situation for a p block comprising npn transistors will be apparent from the above discussion.

Continuing with the example of the conventional n logic block, the collector of the normally conducting transistor is also connected to a reference potential, typically −6 volts. The collectors of the remaining transistors of the block are coupled through individual or common load networks to supply voltage sources. Logical AND and OR circuits may be formed by connecting the collectors either individually, or in common, to a load. The load networks are generally designed to provide output potential levels ranging typically from −6.5 volts to −6.4 volts for the "off" condition, and from −5.6 volts to −5.2 volts, for the "on" condition. The bivalued collector output levels are suitable for direct coupling to the bases of complementary npn junction transistors, forming the "p" block in the next logical stage.

Recently a scheme has been proposed whereby the logical capabilities of the above described circuitry may be greatly extended in the copending application of M. S. Schmookler for "Three Level Logical Circuits," Serial No. 22,289 filed April 14, 1960 and assigned to the same assignee of the present invention. The underlying principle of this scheme is to supply one or more transistors in some or all of the blocks with a signal that drives the base of such transistor towards heavier than normal conduction. Thus, a third level range of voltages is necessary, and for this reason circuits embodying this principle have been named "third level logic," the third level being above the normal conducting level. For the base input of pnp transistors, and hence collector output of npn transistors, the voltage for third level conduction may be −1.2 volts to −2.0 volts. The corresponding voltage level for the base input to npn transistors, and hence collector output of pnp transistors is −4.8 volts to −4.0 volts The effect of application of a third level input signal to the base of a transistor within a given block is to render such transistor strongly conducting and thus override the existing logical function of the block. The third level technique provides a useful tool for increasing the logical capabilities of a given block. The third level signal serves to perform the functions of a supervisory, control or gating signal without the special gating circuitry normally required for such purposes. The conversion from a normal to a third level signal is accomplished by simply changing the values of the components of the inter-block coupling network.

This invention relates to logical circuits of the third level type. The basic circuit of the invention responds to three current input signals, identified as *x*, *y*, and *c*, and delivers complementary current output signals L and $\bar{L}$ according to the following Boolean algebraic relations:

(1) $$L=yc \vee yx \vee x\bar{c}$$

(2) $$\bar{L}=\bar{y}c \vee \overline{yx} \vee \overline{xc}$$

The Boolean algebraic equations and symbols are well known and Equations 1 and 2 may be read as follows. The current L is present, if the currents *y* and *c* are present, or the currents *y* and *x* are present, or the current *x* is present and the current *c* is not present. The current L is not present, if the current *y* is absent and the current *c* is present, or the currents *y* and *x* are both absent, or the currents *x* and *c* are both absent. The symbols *x*, *y*, *c*, L are merely convenient labels, and have no functional significance.

In accordance with a feature of the invention, the novel circuitry provides the maximum number of output signals in complementary pairs without the requirement of additional circuitry. The term "complement" in this context implies the generation of pairs of signals, one pair being present while the other is absent and vice versa. The usage of the term here is to be distinguished from the previous usage in connection with complementary transistor logic blocks, one block being capable of driving the next.

Accordingly the L complement or $\bar{L}$ current is physically provided. It is present whenever the L current is absent. The generation of complementary signal pairs is important in digital computers. Commonly, subtraction is performed by adding the complement of the subtrahend to the minuend, so that a single circuit may at once serve as an adder and subtractor.

Circuitry for performing the logical functions defined by Equations 1 and 2 is useful in digital computers, and will be referred to as a "forcing circuit." The term "forcing circuit" is to be deemed generic to circuits satisfying Equations 1 and 2, and to modifications described herein and other modifications of similar character. The modified forcing circuits are governed by somewhat different input-output signal relations.

The basic forcing circuit and some of its modifications are so-called combinational circuits. This implies that the state (presence or absence) of the input signals uniquely determines the state of the output signals.

According to a further feature of the invention, the forcing circuit concept is extended to sequential circuits by utilizing one or more output signals as input signals. The output signal state of a sequential circuit is not uniquely determined by the state of its input signals, but depends on the previous history of the circuit. The sequential circuit may be placed in one state upon application of an input signal and may remain in this state upon removal of such input signal. In this sense, the circuit has a "memory."

For a more detailed description of combinational and sequential circuits reference may be had to an article by D. A. Huffman, entitled "The Synthesis of Sequential Circuits," Journal of The Franklin Institute, vol. 257, No. 3—March 1954—pp. 161–190, and No. 4, April 1954—pp. 275–303.

In specific embodiments of the invention, a third level data latch, escapement gate, bipolar set trigger, and register circuits are formed as sequential forcing circuits from combinational forcing circuits. These sequential circuits are well known in the art in the broad sense, and reference may be had to copending application of M. E. Homan for "Data Latching Systems," Ser. No. 6,388, filed February 3, 1960, and assigned to the assignee of this invention. The Homan application describes the operation and utilization of the above sequential circuits in detail; these will be summarized briefly herein.

A problem that arises in sequential circuits is that with a change in an input signal, two or more signals generated within the circuit may be changed substantially simultaneously. The final circuit state is indeterminate and depends on which internally generated signal changes first. Such a condition is commonly referred to as a critical race condition. The above-mentioned Homan application is directed to circuitry for eliminating critical race conditions in sequential circuits.

An object of the present invention is to provide third level logic sequential forcing circuits which are free from critical race conditions and with substantial reduction in the number of circuit components.

FIG. 1*a* is a schematic and FIG. 1*b* the corresponding logical representation of the basic combinational forcing circuit in accordance with a preferred embodiment of the invention;

FIGS. 1*c* to 1*g* are logical representations of modifications of the forcing circuit of FIG. 1*a* and are likewise combinational;

Figure 2:
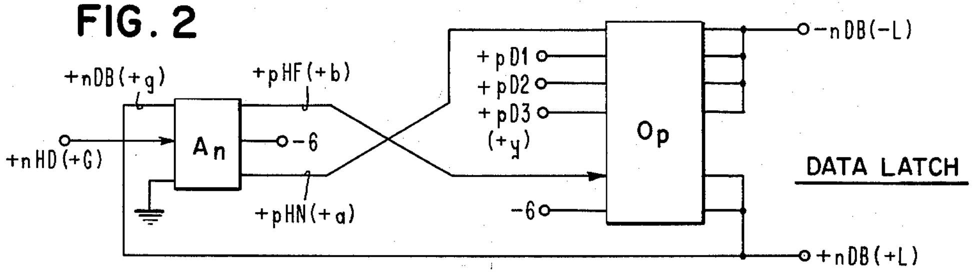
FIG. 2 is a logical drawing of a data latch in accordance with a preferred embodiment of the invention.
Figure 4:
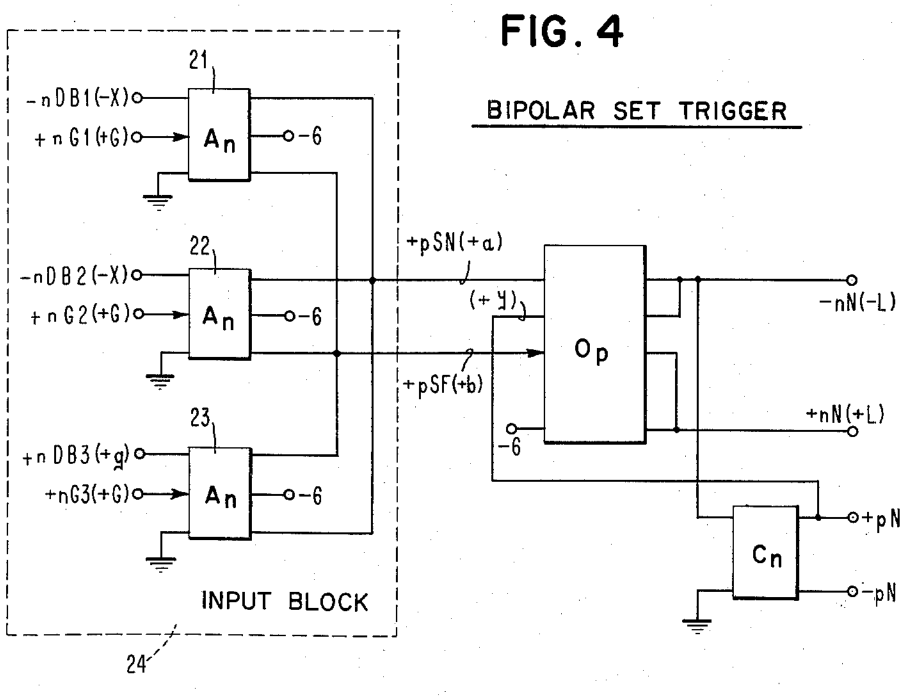
FIG. 4 is a logical drawing of a bipolar set trigger.
Figure 5:
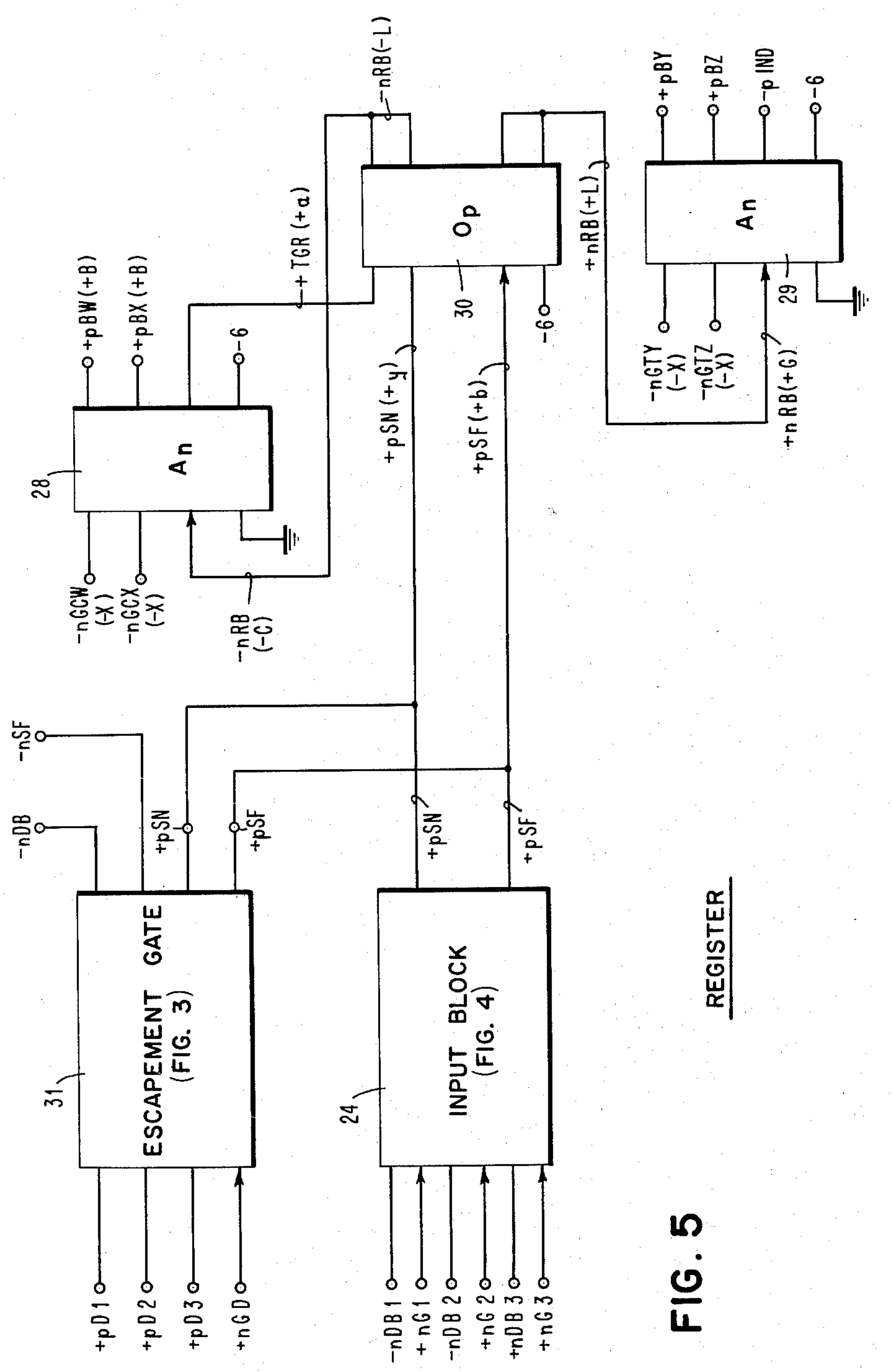
FIG. 5 is a logical drawing of a register.
Figure 7:
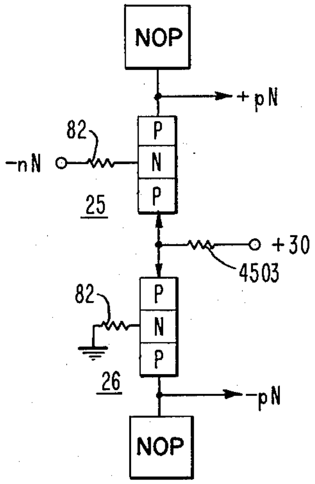
Figure 8:
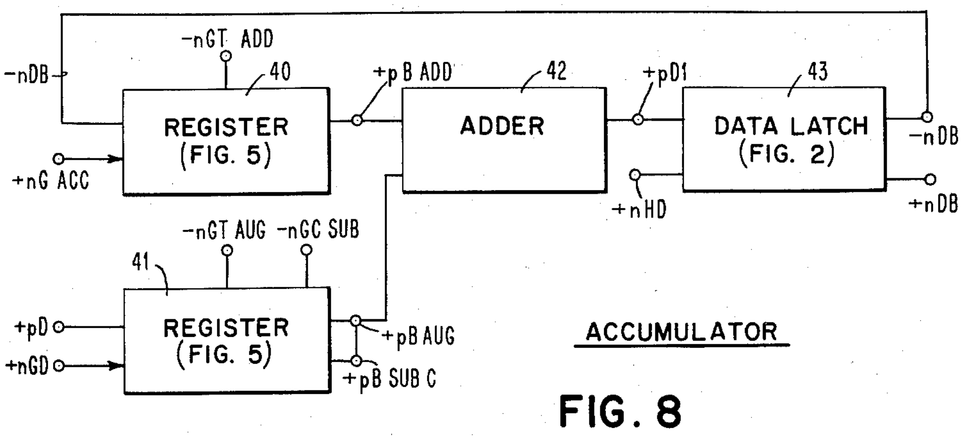

FIGS. 6*a* to 6*d* are schematic drawings of interstage coupling networks used in the circuits of the previous drawing figures;

FIG. 7 is a schematic drawing of a converter network used in the bipolar set trigger circuit of FIG. 4; and FIG. 8 is a block diagram of an accumulator circuit formed from the data latch and register circuits of FIGS. 2 and 5.

COMBINATIONAL FORCING CIRCUITS (FIGS 1*a* TO 1*g*)

The basic forcing circuit (FIG. 1*a*) comprises an n block An and p block Op. The An accepts input signals —*x* and —*c* and delivers output signals +*a* and +*b*, which serve as input signals to the Op blocks. In addition, a signal +*y* is applied to the Op block. The Op block delivers output signals —L and —M. For convenience in terminology, the same reference character will be applied to a signal, to the input terminal that accepts such signal, to the output terminal that delivers such signal, to the line carrying such signal and to the source that generates the signal. Thus, the —*x* signal is generated by the source —*x*. The signal +*a* is carried by the line +*a*.

The signal —*x* when "up" is at the suggested potential level of +0.5 volt, and when "down" is at a potential level of —0.6 volt. The signal —*c* is a third level input signal, being typically +0.5 volt when up and —1.6 volts when down. More generally, a negative signal is absent or up when at the higher potential level, and is present or down when at the lower potential level. Conversely, a positive voltage signal is absent or down when at the lower potential level, and is present or up when at the higher potential level. Current signals bear no sign; the current is either absent or present and its direction is not implicit in the symbol.

The signals +*a* and +*y* are normal output signals of "n" blocks and input signals to "p" blocks. They are at a potential of —6.5 volts when absent and of —5.4 volts when present. The signal +*b* is a third level output signal of an "n" block and an input signal to a "p" block. It is at —6.5 volts when down and at —4.4 volts when up. The third level signals —*c* and +*b* are distinguished from the normal signals by the provision of solid arrowheads at the third level input terminals.

The signals —*x* and —*c* are generated by external sources, which may be the collectors of transistors contained in a preceding "p" block. Similarly, the signal +*y* is generated by an external source, which may be the collector of a transistor contained in an "n" block.

The block An includes transistors T1, T2, and T3 which by way of example are of the pnp type. Conventionally, the middle region of the illustrated transistor is the base and the emitter is identified by the lead containing the arrowhead.

The emitters of transistors T1, T2, and T3 are commoned and connected through a resistor 4501 to a +30 volt source. The reference numeral 4501 signifies that the resistor is nominally 4500 ohms and is the first of a series of resistors of such value. A second 4500 ohm resistor is contained within the Op block and is designated as 4502. Thus with respect to resistors, the units' digit of the reference numeral indicates the ordinal number in a series of resistors of like value, and such value is found by replacing the units' digit in the reference numeral by a zero. It is understood, of course, that the suggested component values are by way of example only.

Figure 6A:
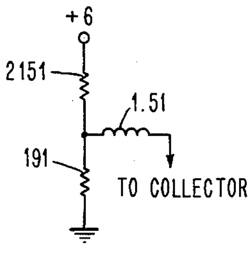
Figure 6B:
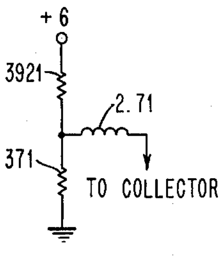

The combination of the +30 volt source and resistor 4501 approximates a constant current source which current flows through the transistor having the most negative base. When the signals —*x* and —*c* are both absent or up, the base of T3, being grounded, is most negative. Hence, the constant current flows through T3 and gives rise to the output current +*b* from the collector of T3. The current produces a signal +*b*, developed across TLP (third level p) coupling network whose circuitry is illustrated in FIG. 6*b*. The coupling network comprises resistors 3921 and 371 connected from +6 volts to ground. A peaking inductance 2.71 is connected from the junction of the resistors to the collector of the transistor. The reference numeral 2.71 implies the first of a series of inductances of 2.7 microhenries. A second inductance of like value is designated 2.72 (FIG. 6*d*).

It is to be noted that when the voltage signal +*b* is present, its associated current signal *b* is also present. The current flows from the collector of T3 into the base of T6. This modus operandi applies generally to the signals of FIG. 1*a*. In the presence of the signal —*x* (voltage), the current *x* is also present and flows from the base of T1. Current and voltage logic therefore may be considered synonymous.

To continue the description of the An block, the base of transistor T3 is connected to reference ground potential, and the collector of T2 is connected to a —6 volt reference potential source. The collector of transistor T1 is connected to the +*a* signal line and also to an NOP (normal p) coupling network whose circuitry is illustrated in FIG.

6*a*. The NOP coupling network comprises a voltage divider composed of resistors 2151 and 191 coupled respectively to +6 volts and ground. The junction of the resistors is connected to the collector through a peaking inductance 1.51.

The coupling networks are identified by three-letter symbols. The last letter signifies the conductivity of the base to which the network is coupled. The first two letters serve otherwise to identify the network, TL for third level and NO for normal. Whether an output signal is normal or third level depends on the components of the coupling network and not on the nature of the input signal giving rise to such output signal.

The operation of the An block is governed by the following considerations. With the signals —*x* and —*c* both absent or "up," the base of T3 is most negative. Hence T3 is on and the third level current signal "*b*" and voltage signal +*b* are generated. Whenever the signal —*c* is present T2 conducts to the exclusion of the other transistors and hense the "*a*" and "*b*" signals are both absent. This is true even if the signal —*x* were present. In this case the —*c* signal dominates the —*x* signal. When the —*x* signal is present and the —*c* signal absent, the base of T1 is most negative, T1 conducts and the "*a*" current and voltage signals are present. Expressed in concise Boolean algebra form, $$(3)\qquad +a=(-x)(\overline{-c})$$

$$(4)\qquad +b=(\overline{-x})(\overline{-c})$$

Equations 3 and 4 are to be read as follows. The voltage signal +*a* is present or up providing that the voltage signal —*x* is present or down, and the voltage signal —*c* is absent and therefore up. The voltage signal +*b* is present or up, providing the voltage signals —*x* and —*c* are both absent or up. Equations 3 and 4 are converted to equations of current logic simply by emitting the + and — signs.

The letter A in the symbol Ap designates "and" gate operation in the sense defined by Equations 3 and 4. The circuitry may be modified to include "or" functions by sunting transistor T1 with additional transistors receiving similar "*x*" signals, say *x*1, *x*2, etc. Equations 3 and 4 are then modified by inserting (—*x*), *v*(—*x*1), *v*(—*x*2), etc. wherever —*x* occurs. In the situation where more than one "*x*" signal is present at any given instant, only one of the transistors receiving the signals will conduct; which one is immaterial. It is only significant that the conducting transistor causes generation of the "*a*" signal. Thus, the paralleled transistors produce an inclusive OR function. The transistor T2 may also be shunted with additional transistors receiving individual —*c* type third level signals to produce an OR function.

Considering now the Op block, the emitters of T4, T5, T6 and T7 are commoned through resistor 4502 to a —36 volt source. The combination of the resistor and source approximates a constant emitter current source, the current from which flows through that transistor having the most positive base. The bases of T4, T5 and T6 receive the "*a*," "*y*," and "*b*" signals respectively. The base of T7 is coupled to the —6 reference voltage source. The collectors of T4 and T5 are connected together to a —L output terminal and to an NON (normal N) coupling network. The collectors of T6 and T7 are coupled together to a —M output terminal and to another NON (normal N) coupling network.

Figure 6C:
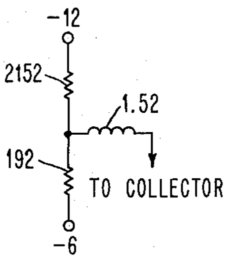
Figure 6D:
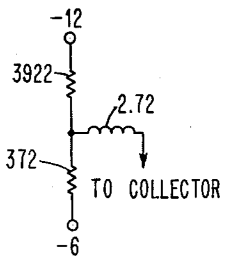

The circuitry of the NON networks is illustrated in FIG. 6*c*. As shown there, a voltage divider is provided which includes resistors 2152 and 192. These are energized by the —12 and —6 voltage sources at their respective terminals. The junction point of the resistors is connected through a peaking inductance 1.52 to the collector. The NON network is converted to a TLP (third level p) network (FIG. 6*d*) by replacing resistors 2152 and 192 and inductance 1.52 by resistors 3922 and 372 and inductance 2.72 respectively. The NON and NOP coupling networks on the one hand, and the TLN and TLP coupling networks on the other hand are seen to be respectively identical, except for the change in energizing potentials.

The Op block functions as follows: assuming first that the "*a*" and "*b*" signals are independent, which in fact they are not. In the absence of the "*b*" signal, T4 and T5 operate in true OR circuit fashion, giving rise to the letter O in the symbol OP. The signal —L will be present when at least one of the "*a*" and "*y*" signals is present. In the case of simultaneous presence of bolth signals, only one of the transistors T4 and T5 will conduct; again, it is only significant that one conduct so that the —L signal may be generated.

When the "*b*" third level signal is present, the base of T6 is most positive and hence T6 conducts, irrespective of the conditions of the "*a*" and "*y*" signals. Hence the —M signal is generated and the —L signal is not. In the absence of all three signals "*a*," "*b*," and "*y*," the base of T7 is most positive. Hence T7 conducts to the exclusion of the other transistors and again the —M signal is generated and the —L signal is not. Expressed in compact Boolean algebra form, $$(5)\qquad -L=(\overline{+b})[(+a)v(+y)]$$

$$(6)\qquad -M=+bv(\overline{+a})(\overline{+y})$$

Equations 5 and 6 are in terms of voltage logic. They also correctly express the current logic relations with the + and — signs omitted as before. It is readily seen that the L and M signals are mutually exclusive or complementary. By inserting the expressions for "*a*" and "*b*" of Equations 3 and 4 in Equations 5 and 6, one arrives at Equations 1 and 2 in terms of current logic, and also voltage logic by the addition of proper signs. The consistency of current and voltage logic is subject to the interpretation, that —M is the same as $(\overline{-L})$ and that the latter symbol implies that the L complement current is present and the —L complement voltage is present and is down. On this basis, Equations 1 and 2 may be expressed to reflect both current and voltage logic, as (1*a*)

$$-L=(+y)(-c)v(+y)(-x)v(-x)(\overline{-c})$$

(2*a*)

$$-M=(\overline{-L})=(\overline{+y})(-c)v(\overline{+y})(\overline{-x})v(\overline{-x})(\overline{-c})$$

In the subsequent description, it will be convenient to treat the voltage signal appearing at the lower terminal of the Op block as a +L signal which is considered to be up when the —M voltage signal is down, and vice versa. Recalling that the +L voltage signal is up when the —M voltage signal is down, it follows that the —L and +L voltage signals are concurrent. Accordingly, Equations 1*a* and 2*a* may be reexpressed as follows:

(1*b*) $+L=(+y)(-c)\ v\ (+y)(-x)\ v\ (-x)(\overline{-c})$ ----- Voltage logic, upper and lower Op output terminals; current logic upper Op output terminal.

(2*b*) $+L=\bar{y}c\ v\ \bar{y}\bar{x}\ v\ \bar{x}\bar{c}$ ----- Current logic, lower Op output terminal.

Equations 1*b* and 2*b* are in a form typical of equations employed hereinafter. The first equation will generally define the voltage logic for the upper and lower output terminals of the Op block. In the present instance it also defines the current logic for the upper Op output terminal. The current logic is obtained in this instance by omitting the + and — signs on the right hand side of the equation, and by replacing ±L by —L on the left hand side. The —L symbol in this latter context is not considered to be a voltage, but merely a shorthand notation that current flows through the —L terminal under the current logic conditions set forth on the right hand side of the equation. The +L symbol appearing on the left side of Equation 2$b$ is similarly to be construed that current flows through the +L terminal under the current logic conditions set forth on the right hand side of the equation. In some instances the first equation will not define the current logic for the upper output terminal. Accordingly an intermediate equation may be written, whose left hand side reads —L, connoting current; i.e., current flows through the —L terminal under the current logic conditions set forth on the right hand side of the equation. It should be noted that the output signals are bipolar on a voltage basis, and are complementary on a current basis. The logical capacity of the Op block may be increased by shunting additional transistors across T4 and T5 and subjecting them to further "$y$" type input signals. Such additional signals function in "or" circuit fashion with the "$y$" and "$a$" signals. This arrangement is used in the modification of FIG. 3 which will be discussed more fully hereinafter. Additionally, or alternatively, the transistor T6 may be shunted by additional transistors receiving "$b$" type third level input signals functioning in "or" circuit fashion with the "$b$" signal. The forcing circuits hereinafter described may be similarly modified with respect to the A or the O blocks, or both.

The circuitry of FIG. 1$a$ is conveniently presented in logical form in FIG. 1$b$. The logical form will be used exclusively hereinafter for other circuit configurations, using the conventions applicable to the arrangement of FIG. 1$b$. In FIG. 1$b$ inputs to the bases of the respective transistors appear on the left side of the block in question. The corresponding collector outputs are on an even level with the respective bases. Emitter bias and collector to base coupling networks are assumed to be contained within the respective blocks in the same manner as in FIG. 1$a$, and are therefore not shown. In correspondence with FIG. 1$a$, the bases of the An block accept input signals $-x$ and $-c$; the remaining base is at reference ground potential. The corresponding collectors are connected to the line $+a$, to the −6 volt reference source, and to the line $+b$. In similar manner, the bases of the Op block are connected to the $+a$ line, the $+y$ signal source, the $+b$ line and the −6 volt reference source. The four collector outputs are connected to the —L output terminal, the —L output terminal, the +L output terminal, and the +L output terminal. The latter terminal corresponds to the terminal —M of FIG. 1$a$, with the above-mentioned substitution.

The forcing circuit modification illustrated in FIG. 1$c$ is obtained by changing the $-c$ signal of FIG. 1$b$ to a +G signal. The +G signal is said to be absent when at the lower potential of −1.6 volts and present when at the higher potential of +0.5 volt. The Equations 1$b$ and 2$b$ are transformed as follows:

(7) $\pm L=(+y)(\overline{+G})\ v\ (+y)(-x)\ v\ (-x)(+G)$ --- Voltage logic upper and lower Op output terminals.

(8) $-L=yG\ v\ yx\ v\ x\overline{G}$ ------------------------ Current logic upper Op output terminal.

(9) $+L=\overline{y}G\ v\ \overline{y}\overline{x}\ v\ \overline{x}\overline{G}$ ------------------------ Current logic lower Op output terminal.

Equations 7 and 8 are inconsistent in respect to the "G" signals, since the G current is present when the G voltage is absent and vice versa. The forcing circuit of FIG. 1$c$ forms the basis of part of the bipolar set trigger circuit of FIG. 4. For convenience in the description of the bipolar set trigger circuit, voltage logic equations defining the "$a$" and "$b$" signals and also their negations in terms of the "$x$" and "G" signals, and the voltage logic equations defining the $\pm$L signal and also its negation $\overline{\pm L}$ in terms of the "$a$," "$b$" and "$y$" signals may be written as follows:

(3$a$) $+a=(-x)(+G)$ (3$b$) $\overline{+a}=(\overline{-x})\,v(\overline{+G})$ (4$a$) $+b=(\overline{-x})(+G)$ (4$b$) $\overline{+b}=(-x)\,v(\overline{+G})$ (5$a$) $+L=(\overline{+b})(+a)\,v(\overline{+b})(+y)$ (5$b$) $\overline{+L}=(+b)\,v(\overline{+a})(\overline{+y})$ The modification of FIG. 1$d$ involves replacing the $-x$ signal of FIG. 1$c$ by a "$+q$" signal and interchanging the derivations of the $+a$ and $+b$ signals. With this change, in the absence of the G voltage signal, neither the "$a$" nor the "$b$" signal is generated, as in the circuit of FIG. 1$c$. In the presence of the G voltage signal, and also of the "$q$" voltage signal, the "$a$" signal is generated and the "$b$" signal is not. In the presence of the G voltage signal and absence of the "$q$" voltage signal, the "$b$" signal is generated and the "$a$" signal is not. Hence the voltage logic of FIG. 1$d$ is the same as that of FIG. 1$c$ with $+q$ replacing $-x$. The equations defining the logic of FIG. 1$d$ are:

(10) $\pm L=(+y)(+\overline{G})\ v\ (+y)(+g)\ v\ (+g)(+G)$ --- Voltage logic upper and lower Op output terminals.

(11) $-L=yG\ v\ y\overline{g}\ v\ \overline{g}\overline{G}$ ------------------------ Current logic upper Op output terminal.

(12) $+L=\overline{y}G\ v\ \overline{y}g\ v\ g\overline{G}$ ------------------------ Current logic lower Op output terminal.

Equations 10 and 11 are inconsistent in regard to the "$q$" and G signals, as for each the current signal is present in the absence of the voltage signal and vice versa. The forcing circuit of FIG. 1$d$ forms the basis of the data latch circuit of FIG. 2. Equations 5$a$ and 5$b$ and the following voltage logic equations will be used in the description of the data latch circuit:

(3$c$) $+a=(+q)(+G)$ (3$d$) $\overline{+a}=(\overline{+q})\,v(\overline{+G})$ (4$c$) $+b=(\overline{+q})(+G)$ (4$d$) $\overline{+b}=(+q)\,v(\overline{+G})$ FIG. 1$e$ illustrates a further modification of the basic circuit of FIG. 1$b$. The "and" circuit is composed of npn transistors and is therefore labeled —Ap. The "or" block is composed of pnp transistors and is therefore labeled —On. The signs of the signals are inverted with respect to those appearing in FIG. 1$b$. The −6 volt and ground reference potentials are interchanged with respect to those of FIG. 1$b$. Internally the emitter bias, and collector to base coupling networks, are appropriately interchanged. Equations 1$b$ and 2$b$ are directly applicable upon replacing each + sign by a − sign and vice versa, and changing Op to —On in the legends to the right of the equations.

The forcing circuit of FIG. 1$f$ is a modification of that of FIG. 1$c$ in that the third and fourth collectors of the Op block are not coupled together. The collector of T6 (third lead from the top of the block) is connected to a —Q output terminal, and internally to the NON network as in FIG. 1$a$. The collector of T7 (bottom lead) is grounded.

For an understanding of the operation of the circuit, let it again be assumed that initially the "$a$" and "$b$" signals are independent, as in the description of FIG. 1$a$. In the absence of the "$b$" signal and presence of at least one of the "$a$" and "$y$" signals, the L current and voltage signals will be generated. In the presence of the "$b$" signal, the Q current and voltage signals will be generated, irrespective of the conditions of the "$a$" and "$y$" signal lines. In the absence of all three signals "$a$," "$b$," and "$y$," the base of T7 is most positive. Hence T7 conducts, and neither the L nor the Q current and voltage signals are generated. In terms of voltage logic, (5$c$) $-L=(\overline{+b})(+a)\ v\ (\overline{+b})(+y)$ (5$d$) $\overline{-L}=(+b)\ v\ (\overline{+a})(\overline{+y})$ (5$e$) $-Q=+b$ (5$f$) $\overline{-Q}=(\overline{+b})$ The L and Q signals are therefore neither complementary nor bipolar. Upon inserting the conditions for generation of the "*a*" and "*b*" signals, there is obtained in terms of voltage logic, $$(13) \qquad -L=(-x)(+G)\ v\ (-x)(+y)\ v\ (\overline{+G})(+y)$$

$$(14) \qquad -Q=(\overline{-x})(XG)$$

Figures 1A, 1B, 1C, 1D, 1F, 1G:
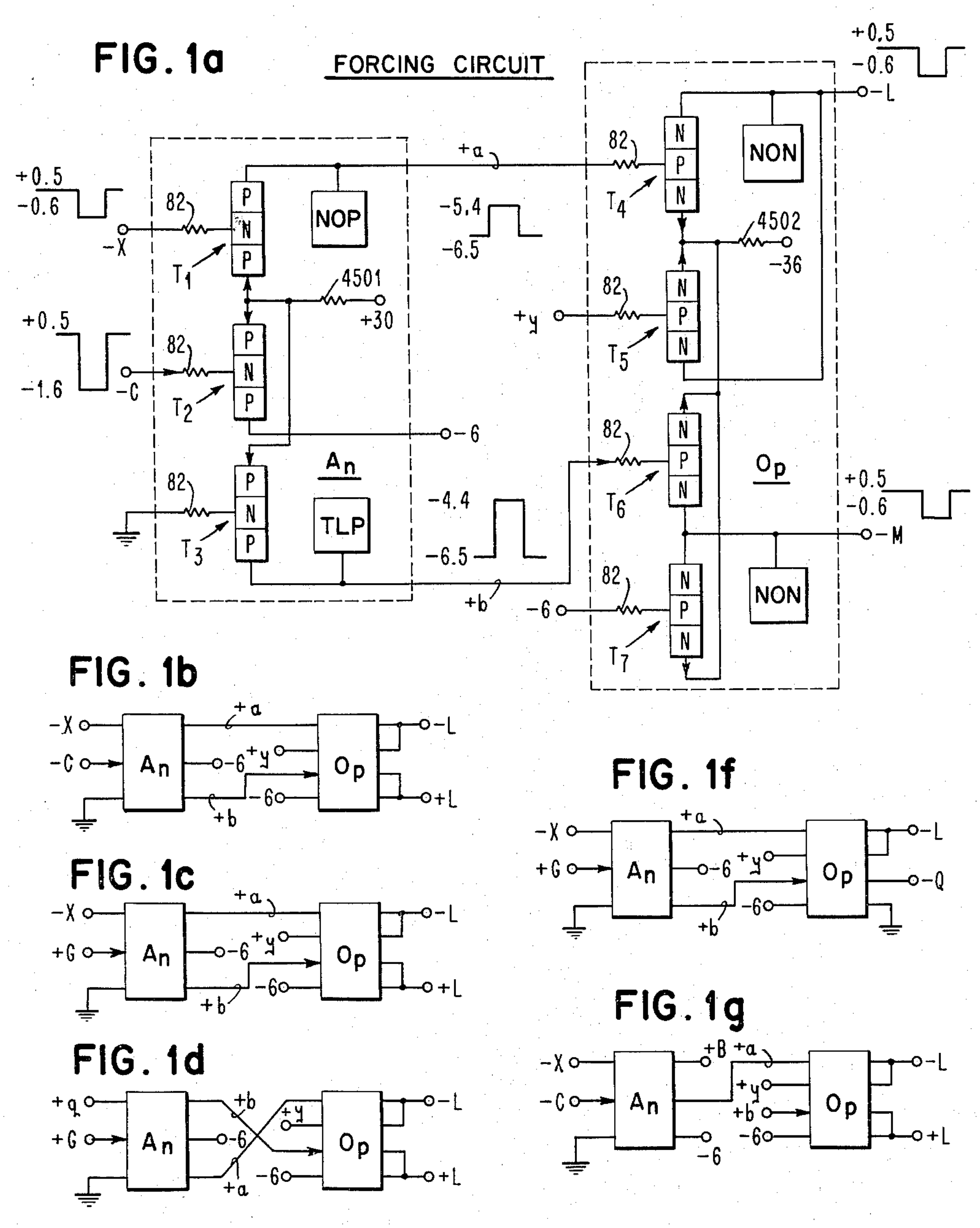
Figure 1E:
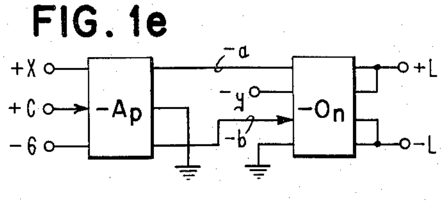

Equations 13 and 14 are also applicable to current logic, by replacing +G by $\overline{G}$, and $(\overline{+G})$ by G, since the G current is present when the G voltage is absent, and vice versa as in FIG. 1*c*. The forcing circuit modification of FIG. 1*f* forms the basis for the escapement gate circuit of FIG. 3. Equations 3*a*, 3*b*, 4*b* and 5*c* to 5*f* will be used in the description of the escapement gate circuit.

FIG. 1*g* is a modification of the forcing circuit of FIG. 1*b* which forms the basis of the register circuit of FIG. 5. The circuitry of FIG. 1*g* differs from that of FIG. 1*b* in the following respects. The output signal of the topmost transistor of the An block, designated as +B, is utilized as a final output signal and not as an input signal to the Op block. The "+*a*" signal is derived from the output of the middle transistor of the An block. The +*b* third level signal is obtained from an independent source.

The circuit performance is defined by the following equations:

| | | |
|---|---|---|
| (3*e*) $+B=(-x)(\overline{-c})$ | (3*f*) $\overline{+B}=(\overline{-x})\ v\ (-c)$ | Current and voltage logic. |
| (4*e*) $+a=-c$ | (4*f*) $\overline{+a}=(\overline{-c})$ | Current and voltage logic. |
| (5*g*) $\pm L=(+b)(+a)\ v\ (+b)(+y)=(+b)(-c)\ v\ (+b)(+y)$ | | Current logic upper Op output terminal; voltage logic upper and lower Op output terminals. |
| (5*h*) $\overline{\pm L}=(+b)\ v\ (\overline{+a})(\overline{+y})=(+b)\ v\ (\overline{-c})(\overline{+y})$ | | Current logic lower Op output terminal; voltage logic upper and lower output terminals. |

Equations 3*e* and 4*e* arise from the following considerations. In the absence of the "*x*" and "*c*" signals, the base of the lowest transistor in the An block is most negative. Hence, neither the +*a* nor the +B signals are generated. In the presence of the "*c*" third level signal, the +*a* signal is generated and the +*B* signal is not. In the presence of the "*x*" signal and absence of the "*c*" signal, the base of the upper transistor in the An block is most negative and the +B signal is generated and "+*a*" signal is not. The input-output signal relations of the Op block are unchanged and are therefore properly defined by Equations 5*g* and 5*h*.

The described combinational forcing circuits are characterized by an unusual simplicity in comparison to prior art circuits of equal logical capacity. Merely two logical blocks are required. The same is true of the sequential forcing circuits described below. Additional modifications of the basic forcing circuit may be readily made by combinations of the described modifications. For example, the circuitry of FIG. 1*e* may be modified in a manner analogous to that used in deriving the circuits of the remaining described modifications of the forcing circuit of FIG. 1*b*.

The combinational circuits of the FIGS. 1*b* to 1*g* may be subjected to static and dynamic input signals and will deliver static and dynamic output signals accordingly. This follows from the fact that the state of the input signals uniquely determines the state of the output signals. A static signal is one that is continuously at one potential level to signify the bit zero, or is continuously at the other potential level to signify the bit one. A dynamic signal is one that can occur only at definite times in an operational cycle, i.e., in synchronous relation to periodically generated clock pulses. When the signal at such times is present, a binary one is indicated, and when absent, a binary zero is indicated, although the opposite convention may be employed. At all other times the signal is absent and has no numerical significance.

The sequential circuits described hereinafter, may accept static or dynamic input signals. Some of the output signals may be of the static type, even upon application of dynamic signals, by virtue of the memory properties of sequential circuits. And, an output signal may persist even though the input signal giving rise thereto is discontinued.

THE DATA LATCH (FIG. 2)

The data latch circuit is formed from the combinational forcing circuit of FIG. 1*d*, by utilizing the +L output signal as the +*q* input signal. In FIG. 2 the signal symbols used in FIG. 1*d* are indicated parenthetically, and a further set of signal labels is employed.

The new symbols indicate certain functions performed by the signals in the digital computer in which the data latch may be incorporated. Usually each capital letter, alphabetic or alphabetic-numeric symbol, will be prefaced by a "+" or "−" sign, followed by "n" or "p" to signify the polarity of the voltage signal and the conductivity of the base of the transistor to which the signal is applied. This is consistent with the previous connotations.

The Op block receives three "*y*" input signals, designated as +pD1, +pD2, +pD3. The signals represent data bits, that is the binary one when the voltage signal under consideration is present and binary zero when it is absent.

Consistent with the previous drawing connotations, the four input signal lines and the four output lines joined in the upper part of the Op block implies internal paralleling of four transistors. The input data "*y*" signals will usually be dynamic signals, but may also be static. They may be applied during mutually exclusive periods of operation of the computer, or may be applied concurrently if it is of interest to determine the presence of binary ones only. The ±nDB output signals represent data that have been "latched" by the circuit. The data latch serves the function of stabilizing the data for application to a register in the presence of the ±HD (hold data) signal. The latter signal will also be usually dynamic, but may likewise be static. The circuit is useful where it is desired to sample the data by means of the +nHD signal and feed the sampled data to a remote register. The "latching" property assures that the output lines will continue to supply the data for so long as the sampling signal continues, even though the input data signals may have changed.

To complete the explanation of the signal symbols, the "*a*" and "*b*" signals are designated as +pHN (hold on) and +pHF (hold off) signals respectively. The operation of the data latch may be summarized briefly as follows. In the absence of the +nHD sampling command signal, the +pHN and +pHF signals are necessarily absent (Equations 3*d* and 4*d*). Hence the output data signals will follow the input data signals (Equations 5*a* and 5*b*), with the following qualification. If the data input signals are applied concurrently and not during mutually exclusive cycles, a binary one will be produced whenever any one of the three input data lines carries a binary one. This follows from the "or" circuit properties of the upper part of the Op block. The follow up of the output data is complete even to the extent, that the output data will be dynamic or static, depending upon whether the input data are dynamic or static. These conditions are represented in compact form as circuit states 1 and 2 in the table below, which is a "truth table" for the data latch.

rently, so long as there is no net change in the "*y*" column simultaneously with a change in the condition of the "G" signal line.

More generally, the truth value T implies higher potential for positive signals and lower potential for negative signals. The truth value F implies lower potential for positive signals and higher potential for negative signals. For signals constituting data bits, the truth value T additionally implies binary one and the truth value F implies binary zero or no numerical significance, irrespective of the sign of the signal. The final column of Table I summarizes the states of the signal lines of the corresponding rows for convenient checking with the applicable equations (here, Equations 3*c*, 3*d*, 4*c*, 4*d*, 5*a* and 5*b*) and for a further purpose explained hereinafter.

*Table I.—Data latch*

| Circuit State | +pD1 etc. (+*y*) | +nHD (+G) | −nDB (−L) | +nDB (+*L*) and (+*q*) | +pHF (+*b*) | +pHN (+*a*) | Summary of Conditions |
|---|---|---|---|---|---|---|---|
| 1 | F | F | F | F | F | F | $(\overline{+G})(\overline{+q})(\overline{+a})(\overline{+b})(\overline{+y})(\overline{+L})$ |
| 2 | T | F | T | T | F | F | $(\overline{+G})(+q)(\overline{+a})(\overline{+b})(+y)(+L)$ |
| 3 | T | T | T | T | F | T | $(+G)(+q)(+a)(\overline{+b})(+y)(+L)$ |
| 4 | F | T | T | T | F | T | $(+G)(+q)(+a)(\overline{+b})(\overline{+y})(+L)$ |
| 5 | F | T | F | F | T | F | $(+G)(\overline{+q})(\overline{+a})(+b)(\overline{+y})(\overline{+L})$ |
| 6 | T | T | F | F | T | F | $(+G)(\overline{+q})(\overline{+a})(+b)(+y)(\overline{+L})$ |

The first column of the truth table contains six possible permanent or stable circuit states which the data latch may be in. The first column also indicates the possible transfers from circuit state to circuit state by means of lines terminated with arrowheads. Lines terminated with arrowheads at both ends indicate reversible circuit state transfers. Lines with but a single arrowhead designate irreversible circuit state transfers. The arrowheads indicate the direction of a transfer.

The columns following the circuit state column refer to the externally and internally generated signals. The former will also be referred to as independent input or primary or external signals. The latter will also be referred to as internal signals. The internal signals include the final output signals. The last in the group of external signals (the "G" signal in the group of "*y*" and "G" signals) is separated in the table from the first in the group of internal signals by a double, rather than a single, vertical line. It is assumed that the externally generated "*y*" and "G" signals do not experience a change in state simultaneously. Whenever one external signal changes the other will not change until after the circuit has settled in the condition resulting from the first signal change. Accordingly, there are two outgoing lines from each circuit state identifying numeral in the first column, one for the change in the "*y*" signal and the other for the change in the "G" signal. The assumption of only one externally generated signal changing at one time also applies to the escapement gate circuit of FIG. 3 and the bipolar set trigger circuit of FIG. 4, but does not apply to the register circuit of FIG. 5.

The single column used for the "*y*" signals applies collectively to the three +pD signals in the sense that the truth value T implies that at least one of the data input lines is at the higher potential or carries the binary one, and that the truth value F implies that each of the three data input lines is at the lower potential and therefore carries binary zero or that such lower potential has no numerical significance (during a cycle when no data are supplied, for example). Accordingly the states of the three input data lines may change inter se, even concur- As stated, in the absence of the +nHD signal, the +nDB output signals follow the +pD input signal. Circuit state 1 reflects input and output of binary zero. Circuit state 2 reflects input and output of binary one. The transfer between these two states is reversible. Assuming circuit state 1 is the initial condition, and that the hold data signal is generated, there is a transfer to circuit state 5. The +pHF signal is now present. Otherwise there is no change in the circuit states (Equations 3*d*, 4*c*, 5*b*). If now the "*y*" signal changes to binary one (circuit state 6), there is no further change in the internal signal states. Thus, the circuit has "latched" the binary zero which was present when the command to hold data arrived. The circuit may be retransferred to state 5 and once more to state 6, and the binary zero will remain latched. Hence, the binary zero output signal is now a static signal which persists while the hold data signal persists, and possibly longer, depending upon whether the hold data signal terminates while the circuit is in state 5 or in state 6. If in the former case, the circuit reverts to state 1, so that the binary zero output persists longer. Thereafter the circuit state may change reversibly to state 2 and state 1, whereupon the output data will follow the input data. If the hold data signal terminates while the circuit is in state 6, the circuit is irreversibly transferred to the state 2. The output signals now represent binary one and will follow the input data.

The circuit functions in an entirely analogous manner if the hold data signal arrives while the binary one data input signal is applied. The transfer is from state 2 to state 3. This transfer is reversible consistent with the requirement that in the absence of the hold data signal the output data will follow the input data. In the transfer from state 2 to state 3, the "*a*" signal changes in truth value (Equation 3*c*). If circuit state 3 is the initial condition, and the data input signal now changes to binary zero, there will be no change in the binary one output signals consistent with the latching property of the circuit. There is no further change in any of the internal signals as may be seen from the table associated with circuit state 4. Also consistent with the latching property, there are no further changes in the internal signal states upon repeated and reversible transfer from circuit state 4 to circuit state 3 and back to circuit state 4. Hence the output signals continue as static binary one signals so long as the hold data signal persists, and possibly longer, depending upon whether the hold data signal terminates while the circuit is in state 3 or state 4. If in the former case, the circuit reverts to state 2, so that the binary one output signal persists longer and is consistent with the requirement that the output data shall follow the input data. Similarly, if the hold data signal terminates while the circuit is in state 4, the output signals will reflect the binary zero and an irreversible transfer from state 4 to state 1 has taken place.

The novel data latching circuit is remarkable for its simplicity as compared to prior art circuits. It requires only two logical blocks as a result of utilizing the third level technique. Additionally, the output phase and feedback phase may be functionally interchanged requiring the outputs of the An block to be interchanged as well as the coupling networks. Further, the novel data latch circuit is race-free even though only two logical blocks are utilized. The race-free character of the circuit will be understood from the following discussion.

The +nDB signal serves as the +L and $+q$ signal because of the feedback connection provided. Thus, the +nDB signal may be considered an internally generated input signal or secondary signal. The same is true of the "$a$" and "$b$" signals, as these also contribute to the determination of the state of the +nDB signal, which in turn contributes to the determination of the states of the "$a$" and "$b$" signals. The —nDB signal is a tertiary signal, since it contributes nothing to the determination of the other signals. The designation as "primary," "secondary," and "tertiary" signals is similar to the nomenclature used in the Huffman article.

Tertiary signals do not contribute to race conditions or to their absence and may therefore be omitted in the last column of some of the truth tables. A race condition can arise only if, in the transition from one circuit states to another, two or more secondary signals experience a change in state. Reference to Table I indicates that there are two such circuit state transfers for the data latch, namely the irreversible transfer from state 4 to state 1 and the irreversible transfer from state 6 to state 2. In the former, the "$a$" and "L" signals are initially present and finally absent. In the latter, initially the "$b$" signal is present and "L" signal is absent, and finally the reverse is true.

Even if more than one secondary signal changes during the transfer from one circuit state to another, there is still no race if the changes occur in sequence. The identity of the first changing signal is predictable. When the first change is complete, the second secondary signal changes in direct response. If there are no more secondary signals subject to change, the circuit state transfer is complete. This is the case in the situations applicable to the data latch. As will be shown, in the transfer from state 4 to state 1, first "$a$" signal changes, and then the "L" signal changes in response to the change of the "$a$" signal. In the transfer from state 6 to state 2, first the "$b$" signal changes, and then the "L" signal changes as a consequence of the change in the "$b$" signal.

A race condition can arise only if, in the transition from one circuit state to another, two or more secondary signals experience a state change substantially simultaneously and independently of each other.

Races may be divided into non-critical races and critical races. In a non-critical race, the order of change of the secondary signals is immaterial. Ultimately the circuit will settle in the desired final state. Hence non-critical races are not objectionable. In a critical race, one may arrive in several final circuit states, depending upon the outcome of the race. This is objectionable. The critical race may not terminate at all, but recur cyclically to result in an oscillation. The data latch, escapement gate and register circuits of the invention are race-free. The bipolar set trigger circuit is subject only to non-critical races.

The race-free transition of the data latch will now be explained with reference to the following Table II.

*Table II.—Data latch—transition from state 4 to state 1*

| Circuit State | Summary of Conditions | Violates Equation |
|---|---|---|
| 4 | $(+q)(+G)(+a)(\overline{+b})(\overline{+y})(+L)$ | ---------- |
| 1$a$ | $(+q)(\overline{+G})(+a)(\overline{+b})(\overline{+y})(+L)$ | (3$d$) |
| 1$b$ | $(+q)(\overline{+G})(\overline{+a})(\overline{+b})(\overline{+y})(+L)$ | (5$b$) |
| 1 | $(\overline{+q})(\overline{+G})(\overline{+a})(\overline{+b})(\overline{+y})(\overline{+L})$ | ---------- |

In Table II, the first column pertains to the circuit states. The initial and final circuit states 4 and 1 correspond to the like-numbered circuit states of Table I. The circuit states 1$a$ and 1$b$ are transitional, unstable states. In each transitional state one governing equation is violated, as indicated in the third column. The circuit conditions are summarized in the second column, which corresponds to the last column of Table I.

In transferring from state 4 to state 1$a$, first the primary signal +G changes to the state $\overline{+G}$. The inherent delay of the An block prevents an immediate change in the state of the "A" signal. In the state 1$a$, the Equation 3$d$ is violated. It should be noted that the "L" signals cannot change as yet, since the presence of the "L" signals is called for by the conditions prevailing in circuit state 1$a$. Upon change of state of the "$a$" signal we arrive in state 1$b$. Equation 3$d$ is now satisfied, but Equation 5$b$ is now violated. A change in the "L" signals is called for. This cannot occur immediately due to the inherent time delay of the Op block. When ultimately the "L" signals change, the circuit is in state 1. There is no violation of any governing equation; hence circuit state 1 is final and stable as required. The transition is race-free, since first the "$a$" signal must change in state, and only thereafter may the "L" signal change in state.

The transition from state 6 to state 2 is similarly race-free, as may be seen from the following Table III. Since the course of events can be analyzed directly from the table, a detailed description will not be given.

*Table III.—Data latch—transition from state 6 to state 2*

| Circuit State | Summary of Conditions | Violates Equation |
|---|---|---|
| 6 | $(+G)(\overline{+q})(\overline{+a})(+b)(+y)(\overline{+L})$ | ---------- |
| 2$a$ | $(\overline{+G})(\overline{+q})(\overline{+a})(+b)(+y)(\overline{+L})$ | (4$d$) |
| 2$b$ | $(\overline{+G})(\overline{+q})(\overline{+a})(\overline{+b})(+y)(\overline{+L})$ | (5$a$) |
| 2 | $(\overline{+G})(+q)(\overline{+a})(\overline{+b})(+y)(+L)$ | ---------- |

THE ESCAPEMENT GATE (FIG. 3)

The escapement gate is formed from the combinational forcing circuit of FIG. 1$f$ by feeding back the —L output signal to the $-x$ input line. As in the case of the data latch, the signals are designated by the function that they perform in the digital computer, and parenthetically by the symbols used in the circuit of FIG. 1$f$. This is done both in FIG. 3 and in the following Table IV, which is the truth table for the escapement gate circuit.

*Table IV.—Escapement gate*

| Circuit State | +pD1 etc. (+$y$) | +nGD (+G) | −nDB (−L) and (−$x$) | −nSF (−Q) | +pHF +pSF (+$b$) | +pHN +pSN (+$a$) | Summary of Conditions |
|---|---|---|---|---|---|---|---|
| 1 | F | F | F | F | F | F | $(\overline{-x})(\overline{+G})(\overline{+a})(\overline{+b})(\overline{+y})(\overline{-L})(\overline{-Q})$ |
| 2 | T | F | T | F | F | F | $(-x)(\overline{+G})(\overline{+a})(\overline{+b})(+y)(-L)(\overline{-Q})$ |
| 3 | T | T | T | F | F | T | $(-x)(+G)(+a)(\overline{+b})(+y)(-L)(\overline{-Q})$ |
| 4 | F | T | T | F | F | T | $(-x)(+G)(+a)(\overline{+b})(\overline{+y})(-L)(\overline{-Q})$ |
| 5 | F | T | F | T | T | F | $(\overline{-x})(+G)(\overline{+a})(+b)(\overline{+y})(\overline{-L})(-Q)$ |
| 6 | T | T | F | T | T | F | $(\overline{-x})(+G)(\overline{+a})(+b)(+y)(\overline{-L})(-Q)$ |

The escapement gate also receives a plurality of "$y$" data bit input signals; by way of example three such signals are illustrated. The three data input signals bear the labels +pD1 to +pD3, the same as the data latch. The −L signal is designated as −nDB for the reasons mentioned in connection with the data latch. The "G" signal is designated as +nGD, signifying a command signal to gate the data inputs. The "$a$" signal is designated as +pSN(set on) for purposes of external utilization and as +pHN as a command to the Op block for the reasons mentioned in the data latch circuit. The "$b$" signal is designated as both +pSF(set off) for purposes of external utilization and as +pHF by analogy to the like named signal in the data latch circuit. Reference is made to Equations (*5e*) and (*5f*). These explain the designation of the −Q signal as −nSF, which corresponds in function to the +pSF signal, except that it is applied to "n" rather than "p" blocks. An example of the utilization of the +pSN and +pSF signals will be given in the description of the register circuit of FIG. 5.

The operation of the escapement gate is very similar to that of the data latch, as may be seen by the line by line correspondence of the circuit states in the Tables III and IV. Such correspondence is subject to the qualification that the −Q signal has no counterpart in the data latch circuit, that the +nDB data latch signal corresponds to the −nDB escapement gate signal, and that the −nDB data latch signal has no counterpart in the escapement gate circuit.

There is no essential difference in the internal operation of the data latch and the escapement gate. The difference arises out of the manner in which the internal signals are utilized for external purposes. In the data latch, the "L" signals were of prime consideration for external use. In the escapement gate the combination of the "$a$" and "$b$" signal states is of prime consideration with reference to setting a bipolar set register as described with reference to FIG. 5. This is more a matter of emphasis than operational difference, since the −L signal of the escapement gate could be directly substituted for the −L signal of the data latch, and the same may be said of the "$a$" and "$b$" signals.

The significance of the "$a$" and "$b$" signals is as follows. A convenient starting point is the presence of the "G" signal (states 5 and 3), rather than their absence (states 1 and 2), as was the case for the data latch. In state 5, the presence of the "$b$" signal and the absence of the "$a$" signal is interpreted as the insertion of binary zero (the "$y$" signal) to a register. Should thereafter the data input signal assume the value binary one (state 6), the "$a$" and "$b$" signals remain in the state signifying binary zero and continue to remain in that state despite repeated and reversible transfers between the states 5 and 6. Also, on transfer from state 5 to state 1, the "$a$" and "$b$" signals both assume a truth value F. This condition is interpreted as "no change"; the register does not respond to this signal combination and remains set at binary zero. The transfer from state 5 to state 1 is reversible, as is also the transfer from state 1 to state 2. The latter transfer produces no change in the "$a$" and "$b$" signals, so that in arriving in the state 2 from state 5, either via state 1 or state 6, binary zero will remain in the register.

The initial insertion and continued indication of binary one is similar. Here we begin with circuit state 3 in which the "$a$" signal is present and the "$b$" signal absent. This combination is interpreted as binary one. Should thereafter the data input signal change to binary zero (state 4), the "$a$" and "$b$" signals continue to reflect binary one, and continue to do so upon retransfer to the state 3. The transfer from state 3 to state 2, and the further transfer to state 1 is reflected by the "$a$" and "$b$" signal lines as "no change". In proceeding from state 3 to state 1 via state 4, the "no change" signal combinations are also arrived at. Hence, the value of the bit set into the register cannot be determined from the state of the "$a$" and "$b$" signals in the circuit states 1 and 2, since these circuit states may be obtained either from the binary zero circuit state 5 or the binary one circuit state 3. Unless previously set in, binary zero is initially set in by the transfer from state 1 to state 5; binary one is initially set in by the transfer from the state 2 to the state 3. The "$a$" and "$b$" signals thus serve to set the register to that bit which is present upon commencement of the "G" signal and such setting cannot be disturbed until the commencement of the next "G" signal. The "$a$" and "$b$" signals perform the escapement gating function of transferring data from many registers to a single register, while the −L signal performs the latching function for the input data; the same is true of the data latch circuit.

The escapement gate may receive dynamic or static input signals. Upon receipt of dynamic signals, the "$a$" and "$b$" signals will remain static in the reversible transfers between the states 5 and 6, 3 and 4, and 1 and 2. They will be dynamic signals in the reversible transfers between the states 2 and 3, 1 and 5. No characterization can be given for the transfers from the state 4 to the state 1, and from the state 6 to the state 2 as these transfers are irreversible. The multiplicity of the "$y$" input signals may be considered similar to situation in the data latch. The two circuits are essentially the same, and shall be so construed in the claims. Strictly speaking, the escapement gate is completed by the addition of the register that is actuated by the "$a$" and "$b$" signal lines; this provides both the latching and gating functions. Consideration of the addition of the register will be deferred for the description of FIG. 5.

Figure 3:
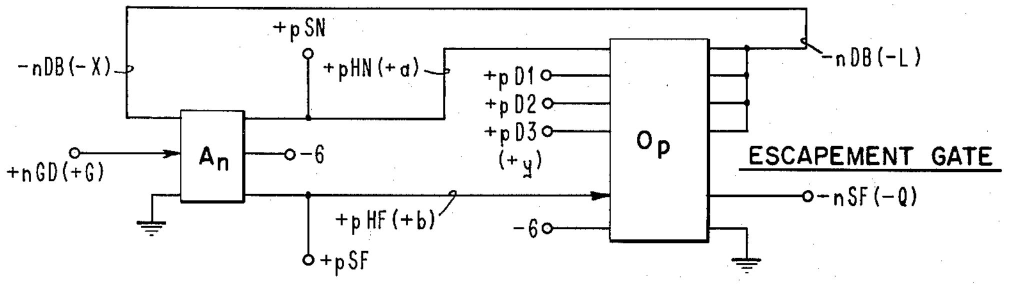
FIG. 3 is a logical drawing of an escapement gate.

The escapement gate circuit of FIG. 3 is also race free for reasons mentioned in connection with the data latch, and presented in tabular form below. The tables cover the situations when more than one secondary signal experiences a change in state during the course of a circuit state transfer.

*Table V.—Escapement gate—transition from state 4 to state 1*

| Circuit State | Summary of Conditions | Violates Equation |
|---|---|---|
| 4 | $(-x)(+G)(+a)(\overline{+b})(\overline{+y})(-L)$ | ---------- |
| 1a | $(-x)(\overline{+G})(+a)(\overline{+b})(\overline{+y})(-L)$ | (3b) |
| 1b | $(-x)(\overline{+G})(\overline{+a})(\overline{+b})(\overline{+y})(-L)$ | (5b) |
| 1 | $(\overline{-x})(\overline{+G})(\overline{+a})(\overline{+b})(\overline{+y})(\overline{-L})$ | ---------- |

*Table VI.—Escapement gate—transition from state 6 to state 2*

| Circuit State | Summary of Conditions | Violates Equation |
|---|---|---|
| 6 | $(\overline{-x})(+G)(\overline{+a})(+b)(+y)(\overline{-L})$ | ---------- |
| 2a | $(\overline{-x})(\overline{+G})(\overline{+a})(+b)(+y)(\overline{-L})$ | (4b) |
| 2b | $(\overline{-x})(\overline{+G})(\overline{+a})(\overline{+b})(+y)(\overline{-L})$ | (5c) |
| 2 | $(-x)(\overline{+G})(\overline{+a})(\overline{+b})(+y)(-L)$ | ---------- |

transistor 26 develops the +nN current complement signal.

The bipolar set trigger circuit is intended for use in selectively gating data bits from many registers into a single trigger circuit. The selective input is provided by the input block 24, whose An blocks accept individual normal type nDB (data bit) signals and individual +nG third level gating signals. By way of example, the gates 21 and 22 are shown to accept negative $(-x)$ type data signals in conformity with the circuit of FIG. 1*c*. The gate 23 on the other hand accepts positive $(+q)$ type data signals, in conformity with the circuit of FIG. 1*d*. Any desired number of similar input An blocks may be provided. However, the individual data and associated gating signals are assumed to exist during mutually exclusive cycles of computer operation. The "*a*" and "*b*" outputs of the three An blocks are respectively coupled together and form the +pSN and +pSF outputs, which are functionally the same as those of the escapement gate.

The operation of the circuit is readily explained with the aid of the following truth table VII.

*Table VII.—Bipolar set trigger*

| Circuit State | ±nDB $(-x)$ or $(+q)$ | +nG (+G) | +pSN $(+a)$ | +pSF $(+b)$ | −nN (−L) | +nN (+L) | +pN $(+y)$ | −pN $(-y)$ | Summary of Conditions |
|---|---|---|---|---|---|---|---|---|---|
| 1 | F | F | F | F | F | F | F | F | $(\overline{-x})(\overline{+G})(\overline{+a})(\overline{+b})(\overline{+y})(\overline{-L})$ |
| 2 | T | F | F | F | F | F | F | F | $(-x)(\overline{+G})(\overline{+a})(\overline{+b})(\overline{+y})(\overline{-L})$ |
| 3 | F | T | F | T | F | F | F | F | $(\overline{-x})(+G)(\overline{+a})(+b)(\overline{+y})(\overline{-L})$ |
| 4 | T | T | T | F | T | T | T | T | $(-x)(+G)(+a)(\overline{+b})(+y)(-L)$ |
| 5 | T | F | F | F | T | T | T | T | $(-x)(\overline{+G})(\overline{+a})(\overline{+b})(+y)(-L)$ |
| 6 | F | F | F | F | T | T | T | T | $(\overline{-x})(\overline{+G})(\overline{+a})(\overline{+b})(+y)(-L)$ |

BIPOLAR SET TRIGGER (FIG. 4)

The bipolar set trigger circuit comprises a plurality of An stages, and here more particularly three such stages 21, 22 and 23, which collectively constitute an input block 24, supplies the +pSN $(+a)$ and +pSF $(+b)$ input signals to the Op block. The "*y*" signal is derived by feeding back the −L signal. This requires signal level conversion, since the −L signal is suitable for application to the base of pnp transistor, whereas the "*y*" signal is applied to the base of an npn transistor. The −L signal line therefore is connected to an input base of a Cn converter block, which produces bipolar output signals +pN and −pN. The +pN signal serves as the "*y*" signal.

The Cn block circuitry is illustrated in FIG. 7. It includes pnp transistors 25 and 26, the emitters of which are coupled together and connected through a resistor 4503 to the +30 volt source. The base of transistor 25 receives the −nN signal. The base of the transistor 26 is grounded. Emitter current flows through that transistor whose base is most negative. In the presence of the −nN signal, transistor 25 conducts and the +pN current and voltage signals are developed across the NOP network connected to its collector. At the same time the −pN voltage signal is developed across the NOP network connected to the collector of transistor 26. In the absence of the −nN signal, transistor 26 conducts, the +pN voltage signals are absent, and the collector of The set trigger circuit operation assumes that only one of the two primary signals "*x*" or "*q*" on the one hand, and "G" on the other hand, will change at a time. During the time interval when data and gating signals are applied to any one of the three An blocks, it is further assumed that the other two blocks receive no gating and data signals.

The ± signals named +nN (on), and the output signals of the Cn block ±pN (on). The four signals have identical stable circuit states; they are either true or on together, signifying binary one (states 4, 5, 6) or false or off together, signifying binary zero (states 1, 2, 3). A convenient starting point for the description of the operation are the states 3 and 4, in which the "G" signal is present. The four N signals follow the data signal, being binary zero and one respectively. Binary zero and one are signified also by the combination of the states of the "*a*" and "*b*" signals, namely absence of "*a*" and presence of "*b*" for binary zero (state 3), and presence of "*a*" and absence of "*b*" for binary one (state 4). The combinations of the states of the "*a*" and "*b*" signals agree with those of the escapement gate. In the remaining circuit states, both the "*a*" and "*b*" signals, in further agreement with the escapement gate state conditions, are absent and hence signify "no change." Thus the bipolar set trigger follows the input data in the presence of the gate signal and remains set to that state, i.e. binary zero or one, which prevailed when the last preceding gate signal terminated. The four outputs are insensitive to simultaneous absence of the "*a*" and "*b*" signals. The circuit "remembers" the bit last set in.

It should be noted that in the reversible transfers between the states 3 and 4, the "*a*," "*b*," nN, and pN signals experience state changes simultaneously. These four signals are all secondary signals, and the remaining +nN and −pN internal signals are tertiary signals. The simultaneous change of all four secondary signals leads to non-critical race conditions described immediately below. There are two further circuit state transfers involving changes in more than one secondary signal, but in each the secondary signals change sequentially, so that no race condition exists. Reference is made to the irreversible transfers from the state 2 to the state 4, and from the state 6 to the state 3. In the former, as a consequence of the generation of the gate signal, the $+a$ signal will first be generated (Equation 3*a*), in response to which the −L signal will be generated (Equation 5*a*), causing generation of the $+y$ signal. Each response is upon lapse of the inherent time delay of the stage generating the signal, so that no race occurs. Similarly, in the latter state transfer, with the generation of the gate signal, in sequence, first the $+b$ signal will be generated (Equation 4*a*), next the −L signal will be terminated (Equation 5*b*), and finally the $+y$ signal will be terminated.

The transitions from the state 4 to the state 3 and vice versa will now be described with reference to the following Tables VIII and IX. The first transition is more complicated and will therefore be described in greater detail. The second transition may be understood from analogy to the first with reference to Table IX.

*Table VIII.—Bipolar set trigger transition from state 4 to state 3*

| Circuit State | Summary of Conditions | Equation or Condition Violated |
|---|---|---|
| 4 | $(-x)(+G)(+a)(\overline{+b})(+y)(-L)$ | |
| 3*a* | $(\overline{-x})(+G)(+a)(\overline{+b})(+y)(-L)$ | (3*b*); (4*a*) |
| 3*b* | $(\overline{-x})(+G)(\overline{+a})(\overline{+b})(+y)(-L)$ | (4*a*) |
| 3*c* | $(\overline{-x})(+G)(+a)(+b)(+y)(-L)$ | (3*b*); (5*b*) |
| 3*d* | $(\overline{-x})(+G)(\overline{+a})(+b)(+y)(-L)$ | (5*b*) |
| 3*e* | $(\overline{-x})(+G)(\overline{+a})(+b)(+y)(\overline{-L})$ | $(\overline{+y})(\overline{-L})$ |
| 3*f* | $(\overline{-x})(+G)(+a)(+b)(+y)(\overline{-L})$ | (3*b*); $(\overline{+y})(\overline{-L})$ |
| 3*g* | $(\overline{-x})(+G)(+a)(+b)(\overline{+y})(\overline{-L})$ | (3*b*) |
| 3 | $(\overline{-x})(+G)(\overline{+a})(+b)(\overline{+y})(\overline{-L})$ | |

*Table IX.—Bipolar set trigger transition from state 3 to state 4*

| Circuit State | Summary of Conditions | Equation or Condition Violated |
|---|---|---|
| 3 | $(\overline{-x})(+G)(\overline{+a})(+b)(\overline{+y})(\overline{-L})$ | |
| 4*a* | $(-x)(+G)(\overline{+a})(+b)(\overline{+y})(\overline{-L})$ | (3*a*); (4*b*) |
| 4*b* | $(-x)(+G)(+a)(+b)(\overline{+y})(\overline{-L})$ | (4*b*) |
| 4*c* | $(-x)(+G)(\overline{+a})(\overline{+b})(\overline{+y})(\overline{-L})$ | (3*a*) |
| 4*d* | $(-x)(+G)(+a)(\overline{+b})(\overline{+y})(\overline{-L})$ | (5*a*) |
| 4*e* | $(-x)(+G)(+a)(\overline{+b})(\overline{+y})(-L)$ | $(+y)(-L)$ |
| 4 | $(-x)(+G)(+a)(\overline{+b})(+y)(-L)$ | |

Referring to Table VIII, circuit state 4, the first transfer is to the state 3*a*, in which the "*x*" signal is now absent; there are no further changes as yet. Equations 3*b* and 4*a* are both violated, calling for changes in the states of the "*a*" and "*b*" signals. The simultaneous violation of two or more governing equations is typical of the beginning of a race. The race might result in a tie (circuit state 3*d*), or the "*a*" signal may win the race (circuit state 3*b*), or the "*b*" signal may win the race (circuit state 3*c*). The tie situation will be considered first, as it is simplest, and most likely to occur. In the circuit state 3*d*, Equation 5*b*, is violated, calling for a change in the state of the −L signal. This occurs in the circuit state 3*e*. This is a new violation, since the −nN signal is off, while the +pN signal is still on. This situation is corrected in the final circuit state 3.

Considering the circuit state 3*b*, only one equation is violated, namely Equation 4*a*. Hence, the "*b*" signal, which had lost the race to the "*a*" signal nevertheless catches up to the "*a*" signal in the circuit state 3*d*, from which the circuit progresses to the final circuit state 3 as in the case of the immediate tie.

Reverting to the circuit state 3*c*, two equations are violated, namely Equations 3*b* and 5*b*. This calls for changes in the "*a*" and "L" signals, and therefore for a new race. It is most likely that the "*a*" signal will win the race, as the change in the "*a*" signal had been called for earlier in circuit state 3*a*. If the "*a*" signal wins the new race, it catches up to the "*b*" signal, which had won the previous race, in the circuit state 3*d*, from which the circuit proceeds ultimately to the circuit state 3. However, the "L" signal may win the new race (circuit state 3*f*), or a new tie may result (circuit state 3*e*). In the latter case, the circuit simply proceeds to the final circuit state 3.

In the circuit state 3*f*, a third race condition exists in that simultaneously Equation 3*b* is still violated and the "*y*" and "L" signals are mismatched. The newest race may result in a tie, namely the final circuit state 3, or in a victory for the "*a*" signal, namely in the circuit state 3*e*, from which the circuit proceeds to the state 3, or in a victory for the "*y*" signal, in circuit state 3*g* from which the circuit also proceeds to the circuit state 3. Accordingly, the race conditions encountered in the transfer from the state 4 to the state 3 are non-critical. The same is true of the transition of the state 3 to the state 4, as can be understood from a consideration of Table IX.

The novel bipolar set trigger circuit is remarkable for its simplicity and freedom from critical race conditions and for having the set on and set off yielding only two logical levels of delay from gate in to output. These advantages result from the utilization of third level techniques. The data inputs will generally be dynamic signals, although they may be of the static type as well, thereby adding to the versatility of the trigger. With use of dynamic signals, the internal signals will also be dynamic in the transfers from the states 3 to 4 and vice versa. In the remaining transfers, the four final output signals are static in view of the memory properties of the circuit. The "*a*" and "*b*" signals also behave statically, except that in the remote case of a repeated reversible transfer between the states 4 and 5, the "*a*" signal will be of the dynamic type, and also in the remote case of a repeated reversible transfer between the states 3 and 1, the "*b*" signal will be of the dynamic type. Additionally, the output phase and feedback phase may be functionally interchanged requiring the outputs of the An block to be interchanged as well as the coupling networks.

THE REGISTER (FIG. 5)

The register circuitry includes An blocks 28 and 29, Op block 30, the input block 24 of FIG. 4, and the escapement gate 31 of FIG. 3. The blocks 30 and 28 constitute a sequential forcing circuit that is obtained from the circuit from FIG. 1*g* by utilizing the −L signal as the $-c$ signal. The "*y*" and "*b*" signals of FIG. 1*g* are obtained as the +pSN and +pSF signals from the input block 24, or the escapement gate 31, or as illustrated, from both. When both the input block 24 and escapement gate 31 are utilized, their respective +pSN terminals and +pSF terminals are coupled together. It is assumed that the escapement gate and input block deliver the combinations of potentials representing set off and set on states (F, T and T, F) during mutually exclusive cycles of operation. For the consideration of the register circuit the previously used concept of treating these states as binary zero and binary one, respectively, is not too useful. It should be appreciated, that for purposes of the invention of FIG. 5, any other suitable source supplying the required combinations of +pSN and +pSF potentials, may be employed. Also, the escapement gate or input block circuit need not be those of the present invention, but could be corresponding prior art circuits.

The An block 28 corresponds to that of FIG. 1*g* in the sense that it accepts a "$-c$" type signal, here identified as −nRB (register bit). Its $-x$ type input signals are designated −nGCW (gate complement to register W), −nGCX (gate complement to register X). Additional gate complements may be provided, assuming that they are applied during mutually exclusive periods, as is the case for the two indicated gate complement signals. Individual +B type collector outputs are designated +pBW (bit to register W), +pBX (bit to register X), etc. The +TGR (trigger) output signal corresponds to the "$a$" signal of FIG. 1*g*.

The An block 29 corresponds to that of FIG. 1*c* in the sense that it accepts a "+G" type signal, here identified as +nRB, which is opposite in polarity to the −nRB signal. Otherwise, the block is similar to the block 28. It accepts mutually exclusive $-x$ type input signals −nGTY (true gate to register Y) and −nGTZ (true gate to register Z), and delivers corresponding output signals +pBY and +pBZ. The remaining signal output −pIND serves as an indication of the state of the register. The ±nRB signals are the ±L output signals of the Op block 30.

The operation of the register circuit will be understood with reference to the following truth table XII.

hence the +B signal is absent (state 3). However, it is possible that a gate complement signal has commenced somewhat early or terminated late, that is, the gate complement signal partially overlaps a gate data signal. This is due to a time displacement of clock pulses within the computer, a phenomenon usually referred to as "clock skewing" or may be due to normal operation. It is imperative that the +B signal be present, so that binary one may be inserted into the proper register. This is the case of state 4.

Starting from the states 3 or 4, if the data gate signal is terminated, the set-on and set-off lines will both be off, signifying "no change," so that the register will remain set off. This is the case (states 1 and 2), as the "L" ($-c$ and +G) signals remain absent. The block 29 remains inhibited, and the block 28 remains enabled. Bit output from the block 29 is still disabled, and the set-off state continues to be indicated. Bit transmission from the block 28 continues in accordance with the absence and presence of the gate complement signals (states 1 and 2).

An analogous operation results beginning with the set on condition (states 5 or 6). The "L" signals are now present, inhibiting the block 28 and enabling the block 29 (Equations 3*f* and 3*a*). The gate complement signals should not be present, but may be present due to clock skewing or may be due to normal operation. Nevertheless no binary one is generated by the block 28 (state 6). The bit output signals of the block 29 are generated, in accordance with the presence and absence of their respective true gate signals. The −pIND signal commences, indicating the set on state. Should the gate data

*Table XII.—Register*

| Circuit State | −nGCW etc. ($-x$) | +pSN ($+y$) | +pSF ($+b$) | +TGR ($+a$) | −nRB (−L) or ($-c$) | +nRB (+L) | +pBW etc. (+B) | Summary of Conditions |
|---|---|---|---|---|---|---|---|---|
| 1 | F | F | F | F | F | F | F | $\overline{(-x)}\,\overline{(-c)}\,\overline{(+a)}\,\overline{(+b)}\,\overline{(+y)}\,\overline{(-L)}\,\overline{(+B)}$ |
| 2 | T | F | F | F | F | F | T | $(-x)\,\overline{(-c)}\,\overline{(+a)}\,\overline{(+b)}\,\overline{(+y)}\,\overline{(-L)}\,(+B)$ |
| 3 | F | F | T | F | F | F | F | $\overline{(-x)}\,\overline{(-c)}\,\overline{(+a)}\,(+b)\,\overline{(+y)}\,\overline{(-L)}\,\overline{(+B)}$ |
| 4 | T | F | T | F | F | F | T | $(-x)\,\overline{(-c)}\,\overline{(+a)}\,(+b)\,\overline{(+y)}\,\overline{(-L)}\,(+B)$ |
| 5 | F | T | F | T | T | T | F | $\overline{(-x)}\,(-c)\,(+a)\,\overline{(+b)}\,(+y)\,(-L)\,\overline{(+B)}$ |
| 6 | T | T | F | T | T | T | F | $(-x)\,(-c)\,(+a)\,\overline{(+b)}\,(+y)\,(-L)\,\overline{(+B)}$ |
| 7 | F | F | F | T | T | T | F | $\overline{(-x)}\,(-c)\,(+a)\,\overline{(+b)}\,\overline{(+y)}\,(-L)\,\overline{(+B)}$ |
| 8 | T | F | F | T | T | T | F | $(-x)\,(-c)\,(+a)\,\overline{(+b)}\,\overline{(+y)}\,(-L)\,\overline{(+B)}$ |
| 9 | F | T | T | F | F | F | F | $\overline{(-x)}\,\overline{(-c)}\,\overline{(+a)}\,(+b)\,(+v)\,\overline{(-L)}\,\overline{(+B)}$ |
| 10 | T | T | T | F | F | F | T | $(-x)\,\overline{(-c)}\,\overline{(+a)}\,(+b)\,(+y)\,\overline{(-L)}\,(+B)$ |

It will be recalled that the set off and set on states occur only in the presence of a gate data or bit signal. This is true of the input block 24 and also of the escapement gate 31. The −nGTY and −nGTZ signals occur with gate data signals, but of course not with each other. The −nGCW and −nGCX signals are gate complement signals in the sense that they occur during cycles when the gate data signals are present; however, they do not occur with the gate data signals; rather, they occur in the absence of the gate data signals, but not with each other. Thus, in any given cycle of operation only one of the true gate signals (−nGTY or −nGTZ) may occur, and only one of the gate complement signals (−nGCW or −nGCX) may occur.

Referring to the "set off" circuit states 3 and 4, it is seen that the "L" signals are absent. Since the "L" signals are supervisory third level type signals and treating them as $-c$ and +G signals, it follows that the block 28 will be enabled and the block 29 will be inhibited (Equations 3*e* and 3*b*). The setoff state will be indicated by the absence of the −pIND signal. The +pBY or +pBZ signals cannot be generated, even should their respective true gate signals be present. The gate complement signals are absent in the presence of the gate data signals, signal terminate, the set-on and set-off lines should both be off, signifying "no change". This is indeed the case (states 7 and 8), as the "L" ($-c$ and +G) signals continue. The block 28 remains inhibited and the block 29 remains enabled and continues to reflect "set-on".

Not all of the inter-state transfers require specific description, since they are apparent from the truth table. The following, however, merit attention. The reversible transfers between the states 3 and 5, 4 and 6, involve for the first time simultaneous changes in the states of two primary signals, namely the set off and set on signals. These transfers arise from the reversible transfers between the states 3 and 4 of the bipolar set trigger (Table VII), or of the input block 24. However, referring to the Tables VIII and IX, it will be recalled that these two transfers are subject to non-critical race conditions. The register responds correctly, whether both the set off and set on signals change exactly simultaneously (state 3 directly to state 5, state 4 directly to state 6, and vice versa), or whether the set off signal changes first (state 3 to state 5 via state 1, state 4 to state 6 via state 2, state 5 to state 3 via state 9, state 6 to state 4 via state 10), or whether the set on signal changes first (state 3 to state 5 via state 9, state 4 to state 6 via state 10, state 5 to state 3 via state 7, state 6 to state 4 via state 8). The register circuit is thus called on to obey the direct or simultaneous transfers occurring within the escapement gate and input block. This gives rise to the circuit states 1 to 8, taking into account the added primary signal —nGCW etc. The register is further called on to obey the transitional conditions of the input block. This gives rise to the added circuit states 9 and 10, and to the added transfers involving these states.

The states 9 and 10 require further consideration as respects the proper transmission and blocking of transmission of the bit outputs from the blocks 28 and 29. At first glance it would appear that in the reversible transfer between states 9 and 10 the +pBW signal is spuriously generated in the state 10. However, the interstate transfer between states 9 and 10 does not occur in practice. The states 9 and 10 are merely transitional states that may occur upon substantially simultaneous changes in the set off and set on signals. Even adding the further change in the —nGCW etc. signals would introduce a simultaneous change in a third primary signal without spurious generation.

As regards the remaining situations involving the states 9 and 10, it will suffice to consider the reversible transition from state 4 to state 10 to state 6, since it involves a change in the +B signal, whereas the other situations do not. Beginning with the state 4, the register will be set off, the block 28 will emit binary one, as it should in spite of clock skewing, and the block 29 will be inhibited. In the state 10, the transmissive state of the block 28 continues and the inhibited state of block 29 also continues. This is desirable, as the bit is emitted by the block 28 in spite of clock skewing, while at the same time the block 29 does not simultaneously emit the bit. In the state 6, the register is set on, the block 28 is inhibited and the block 29 is enabled. Again simultaneous bit emission by both blocks is barred. An exact reversal in the sequence of events obtains from the transition from state 6 via state 10 to state 4. The register is thus not only insensitive to clock skewing, but also to race conditions in its input signals.

The register is also race-free. The —*c* and +*a* signals are the only secondary signals. In view of the simplicity of Equations 4*e* and 4*f* it is readily seen, that ultimately both signals must be either on or off. If one of them undergoes a change, the other one must ultimately do likewise. This can only come about by virtue of the —*c* signal changing first, and that thereafter, and only thereafter, the +*a* signal changes, so that there is no race.

Consider the register circuit of FIG. 5 with the input block 24 and An block 29 omitted, and with the upper two transistors within the An block 28 also omitted. The so modified circuit is not subject to the —nGCW, —nGCX, —nGTY, —nGTZ signals, but is subject to the data and gate signals of FIG. 3. Its performance is defined by the following truth table.

signal terminated, the —nDB signal follows the data (states 1 and 2, proceeding from state 4; states 7 and 8, proceeding from state 5). Thus the signal —nDB is necessarily of the same nature as before. On the other hand, the nRB signals represent "locked data." They are initially placed in agreement with the input data upon initial application of the gate signal and remain in whatever state they were placed in but such initial application of the gate signal, binary zero beginning in state 4 and proceeding to states 3, 2, or 1, or binary one beginning in state 5 and proceeding to states 6, 7 or 8. A termination of the gate signal produces no change; only renewed application can do so. The circuit is seen to provide both latching and locking; it functions in the same manner as the "escapement gate" described in the above-mentioned Homan application, but with fewer logical blocks due to utilization of the third level technique. The circuit is also race-free; this is readily deduced without resort to any tables, since the circuit of FIG. 3 is race-free, and the full circuit of FIG. 5 is also race-free.

The register circuit of FIG. 5 is a highly versatile device. In typical computer applications the +p bit to register outputs may be applied to registers, adders, counters or special logical circuits. The outputs may also form the +pD inputs to the escapement gate 31. For example, plural +pB outputs, which represent adjacent bits in a sequence constituting a complete number, may be connected to the +pD1 etc. input terminals. The thus modified register forms a shift register of well known use in digital computers. It is in the shift register application where the insensitivity of the register to race conditions and clock skewing is of special importance, as the register could not otherwise operate properly.

In connection with an adder, a pair of registers may be used conveniently to form an accumulator, as shown in FIG. 8. The accumulator includes the pair of FIG. 5 type registers 40 and 41, an adder 42, and a FIG. 2 type data latch. The adder 42 is of well-known type and will include suitable conversion means so that it may accept +p input signals and deliver +p output signals. The adder as such forms no part of the present invention, and is therefore not illustrated in detail. The register circuits 40 and 41, and the data latch circuit 43 are provided, only with such input and output signals as are necessary for description of the accumulator, but it should be understood that they may be given their full quota of signals if desired.

The register 40 accepts as its data input signal, the output signal —nDB from the data latch 43. The corresponding gate input signal +nGACC, which functions as a command signal for the register to store the accumulated result, sum or difference. The two signals —nDB and +nGACC would be applied to the input block (corresponding to unit 24 of FIG. 5) of the register.

*Table XIII*

| Circuit State | +pD1 etc. | +nGD | —nDB | —nSF | +pSF | +pSN | —nRB | +nRB | +TGR |
|---|---|---|---|---|---|---|---|---|---|
| 1 | T | F | T | F | F | F | F | F | F |
| 2 | F | F | F | F | F | F | F | F | F |
| 3 | T | T | F | T | T | F | F | F | F |
| 4 | F | T | F | T | T | F | F | F | F |
| 5 | T | T | T | F | F | T | T | T | T |
| 6 | F | T | T | F | F | T | T | T | T |
| 7 | T | F | T | F | F | F | T | T | T |
| 8 | F | F | F | F | F | F | T | T | T |

Table XIII is arrived at from a combination of Tables VII and XII and is interpreted as follows. Beginning with initial application of the gate signal, the —nDB signal reflects latched data (state 4 proceeding to state 3 and return, state 5 proceeding to state 6 and return). With the gate The register 40 further accepts input signal —nGTADD, which corresponds to the signal —nGTY of FIG. 5, and in response delivers to the adder the signal +pBADD. The —nGTADD signal serves as command to insert the addend (or minuend) bit +pBADD into the adder.

The register 41 receives escapement gate type input signals +pD and +nGD. If desired, —nDB and +nG type signals could alternatively be applied to an input block of the register 41. The register further receives input signals —nGTAUG and —nGCSUB, which correspond respectively to the signals —nGTY and —nGCW of FIG. 5. The signal —nGTAUG serves as command signal to insert the bit derived from the +pD signal as an augend bit into the adder. The signal —nGCSUB serves as command signal to insert the bit derived from the +pD signal as a subtrahend bit into the adder. Since subtraction is performed by adding the complement of the subtrahend, the augend and subtrahend output terminals +pBAUG and +pBSUBC may be and are coupled together for connection to the adder.

The adder 42 sums the addend bit with the augend bit or subtrahend-complement bit, and delivers output signal +pD1 to the data latch 43, which also receives hold data signal +nHD, a clock pulse type signal with which the other signals utilized in the accumulator are in predetermined timing relation. The signals +pD1 and +nHD correspond to the like-named signals of the FIG. 2 data latch circuit, as do the output signals ±nDB. The —nDB signal is fed back to the input of the register 40, as previously stated.

The operation of the accumulator is well understood; the register 40 stores what is initially the addend or minuend. The adder 42 adds to this the augend or subtrahend-complement, thereby forming the sum or difference bits. These are transferred via the data latch 43, which performs the data holding function, back to the register, which now stores the sum or difference.

CONCLUSION AND SUMMARY

The invention is directed to a forcing circuit which includes an "and" block (An or —Ap) and an "or" block (Op or —On) each composed of a plurality of transistors of like conductivity type (T1, T2, T3; T4, T5, T6, T7 respectively). The conductivity types of the transistors in the two blocks are complementary to one another so that the first stage may directly drive the second stage. The emitters of each block are supplied by a common constant current source (+30, 4501; —36, 4502). Only one transistor in each block passes the emitter current to the respective collector, namely the transistor whose base potential is furthest removed from cut off potential. Subject to an exception reviewed below, one (T1) or more (FIG. 5, block 28) transistors of the "and" block receive respective bivalued on-off type input signals (—*x* or +*q*) of normal swing. One (T2) or more "or" circuit interconnected transistors of the "and" block receive respective bivalued on-off type input signals (—*c* or +G) of extended "third level" swing causing that transistor to conduct to the exclusion of the others in the block.

The collector of one transistor of the "and" block provides an output signal of normal swing. Several "and" block transistors may be subjected to normal type input signals to provide individual output signals or a common "or circuit type" output signal. Another collector provides a third level type output signal.

In the "or" block each transistor base receives a normal swing input signal (T4), a third level swing input signal (T5), and reference potential (T7). Some of the collectors are provided with respective coupling networks (T4, T6) to provide output signals. These may be normal or third level networks, depending upon the desired application. The collector whose base is connected to reference potential may be connected to the collector of the transistor receiving the third level signal (T7), in which case the output signals are bipolar on a voltage basis or complementary on a current basis, or may be connected to reference potential (FIG. 1*f*), in which case the outputs are non-bipolar and non-complementary. At least one "and" block output signal forms one of the "or" block input signals; more specifically this is true of the normal type signal (FIG. 1*g*). The other, third level output signal of the "and" block may serve as the third level input signal to the "or" block (FIG. 1*b* and others). One (+*y*) or more (+pD) additional normal swing input signals may be applied to bases of additional respective "or" block transistors.

The forcing circuits are combinational, where the signal flow is strictly forward, that is no feedback loop is present. Sequential forcing circuits are formed by applying an output signal in feed-back relation as an input signal. More specifically, a race-free data latch circuit, also considered one form of escapement gate, is formed by applying an output signal of the "or" block as an input signal to the "and" block (FIGS. 2 or 3).

Another form of race-free escapement gate, which may also be considered a form of register circuit, is formed by the combination of the data latch circuit (considered as an "escapement gate") with a second sequential forcing circuit. In this arrangement, the "and" block output signals of the data latch circuit serve as normal (set on) and third level (set off) input signals for the "or" block of the data latch circuit and also of the "or" block of the second sequential forcing circuit (FIG. 5). An output signal of the latter "or" block serves as a third level input signal to the "and" block of the second sequential forcing circuit. An output signal (of the normal swing type) of the latter "and" block serves as input signal for the second "or" block, which in turn provides a third level input signal for the second "and" block. The second "and" block need not be provided with normal input signal receiving transistors to constitute an "escapement gate"; this constitutes the exception referred to above. If the second "and" block is provided with such additional transistor or transistors, providing common or individual outputs, a more versatile register circuit is formed. Transmission of the latter outputs is blocked in the set on state of the register and is enabled in the set off state. The register capability is further increased by addition of a third "and" block which receives a complementary third level output signal from the second "or" block and is otherwise of similar construction as the second "and" block. An output signal of the second "and" block serves to indicate the state of the register. The remaining output signals of the third "and" block are transmitted in the set on state of the register, and are blocked in its set off state. The complete register is insensitive to clock skewing and race conditions of its input signals (FIG. 5).

A bipolar set trigger type of sequential forcing circuit is formed of an input block (24, FIG. 4) which supplies normal (set on) and third level (set off) input signals to the "or" block. The input block is composed of one or more "and" blocks subject to respective normal and third level input signals. The input block may be used instead of, or in addition to, the escapement gate to provide the set on and set off signals for the "or" block of the register circuit of FIG. 5.

The "or" block of the bipolar set trigger circuit delivers bipolar output signals, one of which is applied as an additional normal type input signal to the "or" block. The feedback loop includes a converter stage which provides a pair of bipolar output signals one of which constitutes the last-mentioned normal type input signal for the "or" block. The bipolar set trigger thus provides two pairs of bipolar output signals which may serve as input signals for transistors of opposite conductivity types. The input block, and consequently the complete set trigger circuit are subject to merely non-critical race conditions.

Further modifications may occur to those skilled in the art, and it is intended that such modifications be embraced within the invention to the extent that they fall within the spirit and scope of the appended claims. In the claims, the terms "normal signal," "normal type signal,"

"normal swing signal," "normal coupling network," "third level signal," "third level type signal," "third level swing signal," "third level coupling network," and derivative terms are presented without further definition for brevity, as such definition is adequately set forth in the preceding description.

I claim:

1. A forcing circuit, comprising a logical AND block and a logical OR block, each block including a plurality of transistors of like conductivity type and complementary to that of the other block, each transistor having emitter, base and collector electrodes, the emitters in the respective blocks being coupled together, means for applying different level potentials to said base electrodes, means in each block for applying substantially constant biasing current to said emitter electrode, whereby said current flows in that transistor in which the base electrode is at the most favorable potential level for conduction, and an output signal producing network coupling the collector electrode of a transistor in said AND block to a base electrode of a transistor in said OR block, said network producing a signal corresponding to the highest of said different level potentials, whereby the output from said OR circuit may be forced by the application of a signal from said coupling network.

2. A logical forcing circuit for generating logical function signals of the bivalued On-Off type, comprising a logical AND block and a logical OR block, each said blocks comprising a plurality of transistors of like conductivity type and complementary to that of the other block to permit direct-current interblock coupling, each transistor having base, emitter and collector electrodes, the emitter electrodes of the transistors in each block being interconnected, means for applying a fixed reference voltage to the base of one of said transistors, means for applying normal bivalued input signal potential to the bases of others of said transistors, the signal potentials being such that at one value thereof, conductivity of the transistor is prevented and at the other value the transistor is rendered conducting, means for applying third level bivalued input signal potentials to the base of another transistor to prevent conduction of the transistor at one potential value and to render the transistor conducting at the other value corresponding to the third level of applied potentials, the third level of applied potential causing the transistor to conduct to the exclusion of the remaining transistors in the block, means for applying substantially constant biasing current to the interconnected emitter electrodes of each block, the current flowing through that transistor whose base electrode is at a voltage most favorable for conduction to the exclusion of the remaining transistors in such block, and a first coupling network coupled to a reference potential source and to a collector electrode of one of said transistors in said AND block for producing bivalued output signal voltages that are logical functions of the base input signals, said coupling network permitting direct-current coupling from the collector electrode of the transistor in one block to the base electrode of a first transistor in the complementary block.

3. The circuit according to claim 2, wherein said coupling network includes means for producing a normal bivalued input signal constituting one input to said OR block.

4. The circuit according to claim 3, wherein said coupling network is connected to that transistor receiving said third level input signals.

5. The circuit according to claim 3, and further comprising a connection from a base electrode of a transistor in each block to a fixed reference potential.

6. The circuit according to claim 5, wherein the AND block transistor whose base is coupled to a fixed reference potential further comprises a connection between the collector electrode thereof and a source of fixed reference potential.

7. The circuit according to claim 5, and further comprising output signal coupling networks coupled to two of the collector electrodes in said OR block for producing respectively bivalued output signal voltages that are logical functions of the input signals for the base electrodes of the transistors in said AND and OR blocks.

8. The circuit according to claim 7, and further comprising means for applying a second normal bivalued input signal to a base electrode of a second transistor in said OR block.

9. The circuit according to claim 7, wherein said coupling networks connected to the collector electrodes of the transistors in said OR block are commoned, means for applying a third level bivalued input signal to a base electrode of a transistor in each of said AND and OR blocks, and a common coupling network connected to the collector electrodes of those transistors in said OR block whose base electrodes receive said third level bivalue input signal and said reference potential respectively, said commoned coupling networks providing respective output signals that are bipolar and complementary.

10. The circuit according to claim 8, and further comprising means for coupling a collector electrode in said OR block to a source of fixed reference potential.

11. The circuit according to claim 1, and further comprising a second coupling network coupled to a collector electrode of a second of said transistors in said AND block.

12. The circuit according to claim 10, wherein said forcing circuit is of the sequential type, and further comprising a first third level coupling network connected to the collector electrodes of the OR block transistors receiving said normal input signals, a second third level coupling network connected to the collector electrodes of the OR block transistors receiving said third level signals and said base reference voltage respectively, the respective third level coupling networks providing output signals that are bipolar and complementary, and means for feeding-back one of said bipolar signals, as a third level input signal, to the AND block.

13. A register circuit, comprising a forcing circuit according to claim 12, a second AND block of similar composition to the aforesaid AND block, means for applying respective reference potentials to the base and collector electrodes of one of said second AND block transistors, means for applying normal input signal potentials to the base electrodes of corresponding transistors in said AND blocks, means for deriving normal output signal potentials from collector electrodes of corresponding transistors in said AND blocks, means for feeding-back the other of said bipolar output signals as a third level input signal to a transistor base electrode of said second AND block, and means for deriving from the collector of the last-mentioned transistor an output signal indicating the state of the register.

14. The circuit according to claim 2, and further comprising means for applying said third level and normal input signals respectively to the base electrodes of two transistors in said AND block, a normal output signal coupling network and a third level output signal coupling network connected respectively to a pair of AND block transistors, means for applying signals from said coupling networks to two OR block transistor base electrodes respectively, and an output signal producing coupling network connected respectively to two OR block transistor collector electrodes.

15. The circuit according to claim 2, wherein said reference voltage is applied to the base electrode of a first transistor in said AND block, said third level signal is applied to the base electrode of a second transistor in said AND block, means for applying a reference potential to the collector electrode of said second transistor in said AND block, means for applying said normal input signal to the base electrode of a third transistor in said AND block, a normal output signal producing network and a third level output signal producing network connected respectively to said first and third transistors in said AND block, means for applying the output signals from said coupling networks as input signals to base electrodes of a first and second transistor in said OR block respectively, means for applying respectively a reference potential and a normal input signal to the base electrodes of a third and fourth transistor of said OR block, and an output signal producing coupling network connected to the collector electrodes of two OR block transistors.

16. A sequential circuit according to claim 15, and further comprising means for applying one of said OR block output signals in feed-back relation as normal input signals to the base electrodes of said third transistor in said AND block and said first transistor in said OR block.

17. A data latching circuit according to claim 15, and further comprising means for applying one of said OR block output signals in feed-back relation as a normal input signal to the base electrodes of said third transistor in said AND block.

18. The circuit according to claim 15, and further comprising a common output signal producing coupling network connected to the collector electrodes of said first and fourth transistors in said OR block, and a common output signal producing coupling network connected to the collector electrodes of said second and third transistors in said OR block, said last-mentioned OR block output signals being bipolar and complementary.

19. A data latching circuit according to claim 18, and further comprising means for applying one of said bipolar signals in feed-back relation as a normal input signal to the base electrode of said third transistor in said AND block.

20. A data latching circuit according to claim 18, and further comprising means for applying the output signal from said common OR block coupling network, in feed-back relation, to the base electrode of said third transistor in said AND block.

21. The circuit according to claim 2, wherein said reference voltage is applied to the base electrode of a first transistor in said AND block, said third level signal is applied to the base electrode of a second transistor in said AND block, means for applying a reference potential to the collector electrode of said second transistor in said AND block, means for applying said normal input signal to the base electrode of a third transistor in said AND block, a normal output signal producing network and a third level output signal producing network connected respectively to said first and third transistors in said AND block, means for applying the output signals from said coupling networks as input signals to base electrodes of a first and second transistor in said OR block respectively, means for applying respectively a reference potential and a normal input signal to the base electrodes of a third and fourth transistor of said OR block, means for applying reference potential to the collector electrode of said third transistor in said OR block, and respective output signal producing coupling networks connected to the base electrode of said second transistor in said OR block and to the base electrodes of said first and fourth transistors in said OR block.

22. An escapement gate according to claim 21, and further comprising means for applying the output signal from the last-mentioned OR block coupling network in feed-back relation to the base electrode of said third transistor in said AND block.

23. A bipolar set trigger according to claim 22, and further comprising a converter including a pair of transistors of the same conductivity type as that of said AND block, means for applying one of said bipolar OR block output signals as an input signal to said converter to cause said converter to produce a second pair of bipolar signals applicable as input signals to transistors of the same conductivity type as that of said OR block, and means for applying one of the bipolar signals of said latter pair in feed-back relation as an input signal to the base electrode of the fourth transistor in said OR block.

References Cited in the file of this patent

UNITED STATES PATENTS

| | | |
|---|---|---|
| 2,888,525 | Eckess | May 26, 1959 |
| 2,927,733 | Campbell | Mar. 8, 1960 |